US008654398B2

(12) United States Patent
Dewancker et al.

(10) Patent No.: US 8,654,398 B2
(45) Date of Patent: Feb. 18, 2014

(54) METHOD FOR SIMULATING IMPACT PRINTER OUTPUT, EVALUATING PRINT QUALITY, AND CREATING TEACHING PRINT SAMPLES

(75) Inventors: Ian Dewancker, Vancouver (CA); Arash Abadpour, Toronto (CA); Eunice Poon, Markham (CA); Kyel Ok, Atlanta, GA (US); Yury Yakubovich, Markham (CA)

(73) Assignee: Seiko Epson Corporation, Tokyo (JP)

( * ) Notice: Subject to any disclaimer, the term of this patent is extended or adjusted under 35 U.S.C. 154(b) by 144 days.

(21) Appl. No.: 13/423,452

(22) Filed: Mar. 19, 2012

(65) Prior Publication Data
US 2013/0242354 A1 Sep. 19, 2013

(51) Int. Cl.
| H04N 1/00 | (2006.01) |
| G06K 15/02 | (2006.01) |
| G06K 9/03 | (2006.01) |
| G06K 9/46 | (2006.01) |
| G06K 9/56 | (2006.01) |
| G06K 9/60 | (2006.01) |
| G06T 7/00 | (2006.01) |

(52) U.S. Cl.
CPC ....... *H04N 1/00005* (2013.01); *H04N 1/00015* (2013.01); *H04N 1/00029* (2013.01); *H04N 1/00031* (2013.01); *H04N 1/00034* (2013.01); *H04N 1/00039* (2013.01); *H04N 1/00045* (2013.01); *H04N 1/00055* (2013.01); *G06T 7/0002* (2013.01); *G06K 9/036* (2013.01); *G06K 9/4638* (2013.01); *G06K 9/56* (2013.01); *G06K 9/60* (2013.01); *G06K 15/025* (2013.01); *G06K 15/027* (2013.01)
USPC .......... 358/1.9; 358/3.24; 358/3.26; 358/406; 382/112; 382/204; 382/205

(58) Field of Classification Search
USPC ................... 358/1.9, 3.24; 382/112, 203–205
See application file for complete search history.

(56) References Cited

U.S. PATENT DOCUMENTS

| 3,445,670 A | 5/1969 | Westdale |
| 4,613,945 A | 9/1986 | Parker |
| 5,048,096 A | 9/1991 | Beato |
| 5,078,666 A | 1/1992 | Porret et al. |
| 5,384,859 A * | 1/1995 | Bolza-Schunemann et al. ............... 382/112 |

(Continued)

FOREIGN PATENT DOCUMENTS

| EP | 1 157 544 B1 | 11/2001 |
| WO | 01/14928 A2 | 3/2001 |

OTHER PUBLICATIONS

Bergman, R., et al., "Comprehensive Solutions for Removal of Dust and Scratches from Images", HP Laboratories, Feb. 6, 2007.

(Continued)

*Primary Examiner* — Scott A Rogers

(57) ABSTRACT

An automated printout inspection system identifies glyphs in an image by calculating a connectedness score for each foreground pixel, and comparing this score with a specified threshold. The system further generates training images by simulating printouts from an impact printer, including the specifying of specific error types and their magnitudes. The simulated printouts are combined with scan images of real-world printout to train an automated printout inspection system. The inspection results of the automated system are compared with inspection results from human inspectors, and test parameters of the automated system are adjusted so that it renders inspection results within a specified range of the average human inspector.

20 Claims, 28 Drawing Sheets

(56) References Cited

U.S. PATENT DOCUMENTS

| | | | | |
|---|---|---|---|---|
| 5,631,746 | A | 5/1997 | Overall et al. | |
| 5,841,903 | A | 11/1998 | Kikuchi | |
| 6,189,792 | B1 | 2/2001 | Heske, III | |
| 6,275,600 | B1 * | 8/2001 | Banker et al. | 382/112 |
| 6,320,676 | B1 | 11/2001 | Yoshidome | |
| 6,650,789 | B2 | 11/2003 | Edgar et al. | |
| 6,665,425 | B1 * | 12/2003 | Sampath et al. | 382/112 |
| 6,748,097 | B1 | 6/2004 | Gindele et al. | |
| 7,068,818 | B2 * | 6/2006 | Nishio et al. | 382/112 |
| 7,076,086 | B2 * | 7/2006 | Miyake et al. | 382/112 |
| 7,092,119 | B1 | 8/2006 | Hinds et al. | |
| 7,167,580 | B2 * | 1/2007 | Klein et al. | 382/112 |
| 7,376,258 | B2 * | 5/2008 | Klein et al. | 382/112 |
| 7,382,507 | B2 * | 6/2008 | Wu | 358/1.9 |
| 7,433,098 | B2 * | 10/2008 | Klein et al. | 382/112 |
| 7,486,413 | B2 | 2/2009 | Eliav et al. | |
| 7,532,767 | B2 | 5/2009 | Oztan et al. | |
| 7,539,583 | B2 | 5/2009 | Fu et al. | |
| 7,545,985 | B2 | 6/2009 | Zhang et al. | |
| 7,586,627 | B2 | 9/2009 | Haas et al. | |
| 7,606,689 | B2 | 10/2009 | Kawakami | |
| 7,719,543 | B2 | 5/2010 | Jabri et al. | |
| 7,742,193 | B2 | 6/2010 | Kaltenbach et al. | |
| 7,796,806 | B2 | 9/2010 | Kalevo | |
| 7,869,645 | B2 | 1/2011 | Zandifar | |
| 8,120,816 | B2 * | 2/2012 | Wu et al. | 358/3.26 |
| 8,150,106 | B2 * | 4/2012 | Wu et al. | 382/112 |
| 8,379,229 | B2 * | 2/2013 | Zandifar | 358/1.1 |
| 2003/0016858 | A1 | 1/2003 | DeYong et al. | |
| 2003/0039402 | A1 | 2/2003 | Robins et al. | |
| 2006/0147092 | A1 | 7/2006 | Zhang et al. | |
| 2007/0195351 | A1 | 8/2007 | Mashtare et al. | |
| 2008/0013848 | A1 | 1/2008 | Wu et al. | |
| 2008/0137914 | A1 | 6/2008 | Minhas | |
| 2009/0041331 | A1 | 2/2009 | Prakash | |
| 2010/0039510 | A1 | 2/2010 | Gold et al. | |
| 2011/0149331 | A1 * | 6/2011 | Duggan et al. | 382/112 |

OTHER PUBLICATIONS

Rosenberger, Roy R., "Quantitatively Relating Ink Jet Print Quality to Human Perception", 2003.

* cited by examiner

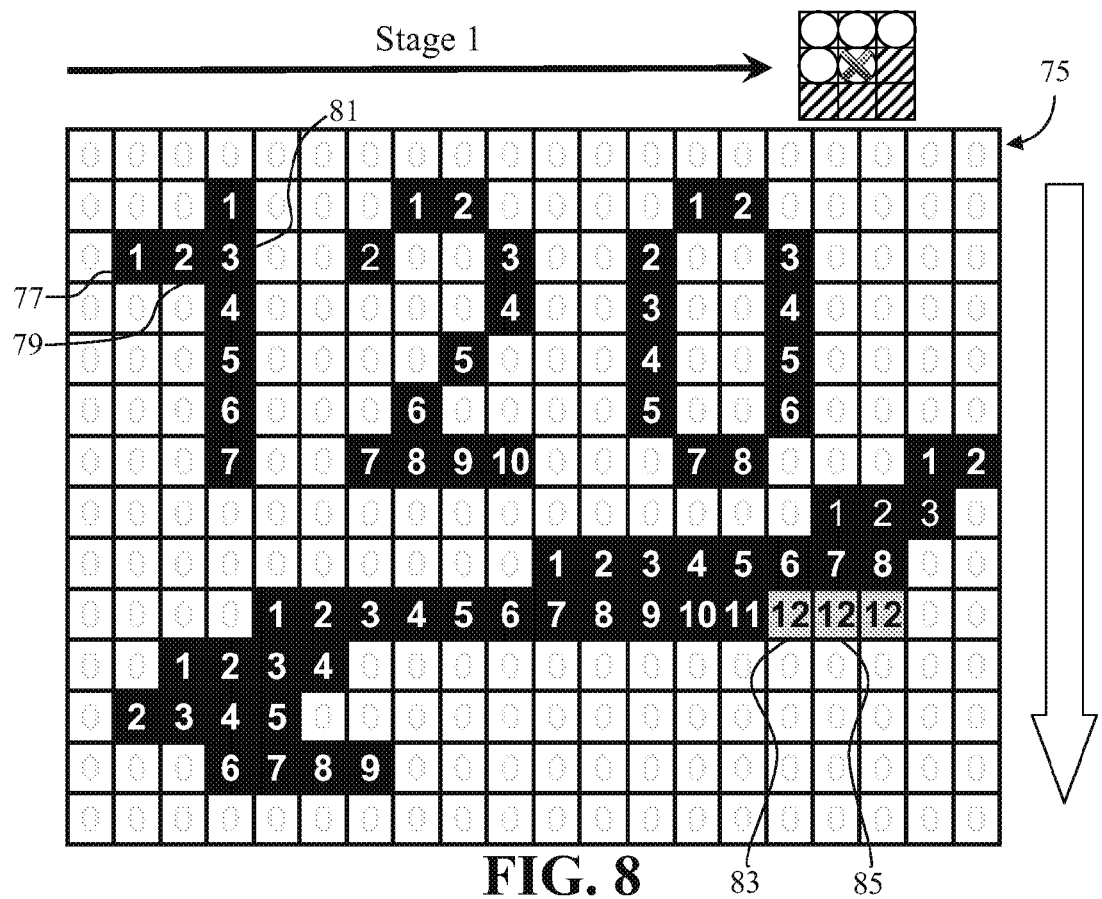
FIG. 8
FIG. 9
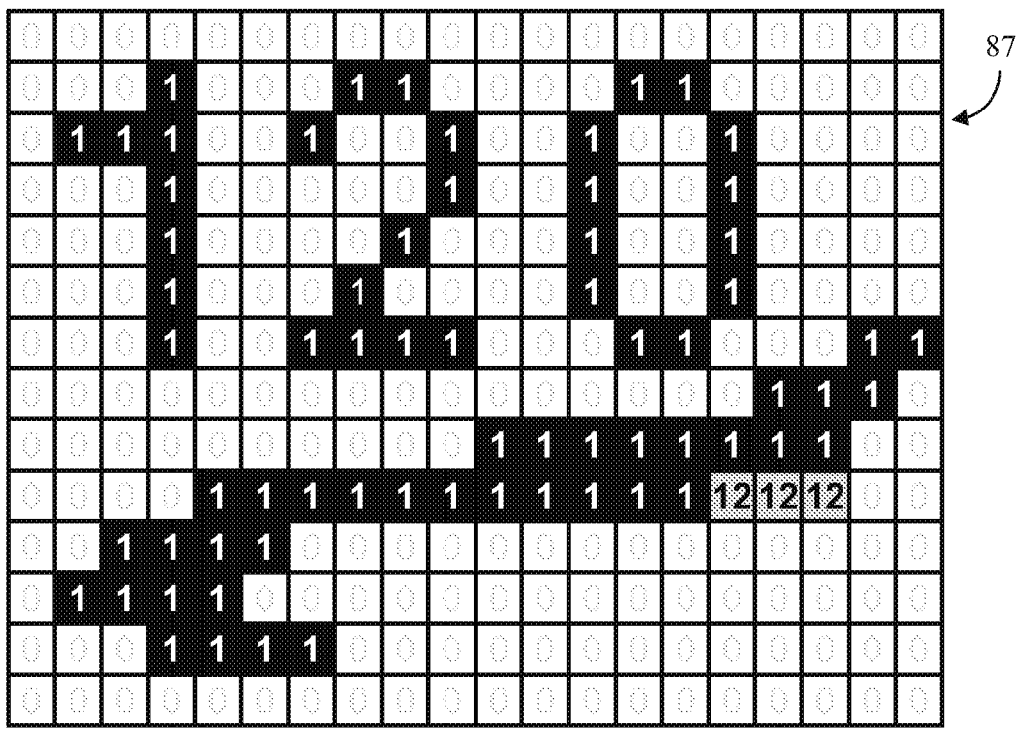

| Effort | 1 | 2 | 3 | 4 | 5 | 6 | 7 | 8 |
|---|---|---|---|---|---|---|---|---|
| Elapsed Time | 46ms | 62ms | 110ms | 141ms | 156ms | 172ms | 218ms | 250ms |
| Detected Area | 40% | 83% | 93% | 99% | 99% | 100% | 100% | 100% |

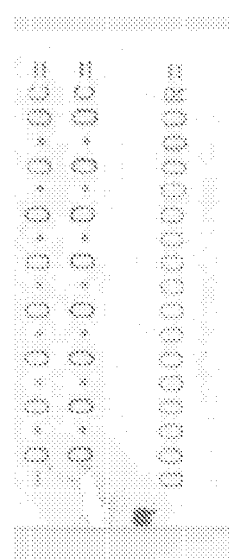
FIG. 24C
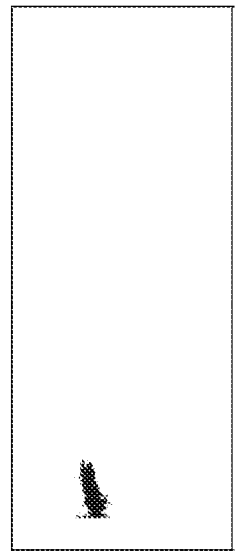
FIG. 24B
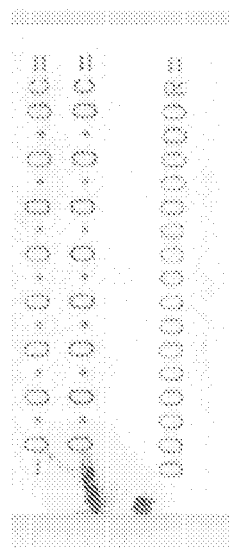
FIG. 24A
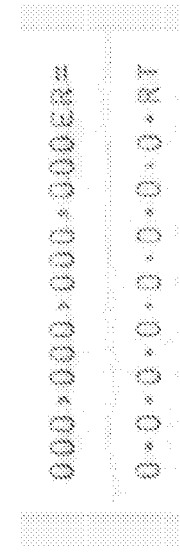
FIG. 25C
FIG. 25B
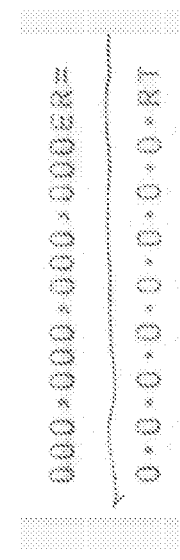
FIG. 25A

```
            %Determine the dimensions of one grid point (i.e.
            grid_size). From a Gaussian function, create an ink-blot
            of dimension grid_size.
produce template ink_blot
            %Create a basic noise blot of dimension grid_size from a
            simple circle, to have the same dimension as ink_blot
produce template noise_blot
            %Pressure map generated by creating template size 2D
            Gaussian
produce pressure_map
            %Noise map generated from horizontally elongated 2D
            Guassian. Noise and pressure map are the same dimensions
produce noise_map
For each grid point on template image (start from
      ribbon_x, ribbon_y)
{
            %Examine each grid_size area (i.e. grid point) of the
            template_image.

%Content is used to measure the impact level that the
            template will make with current grid point. A lower
            value implies a darker imprint (or more character
            content) and so implies a higher impact with the paper.
            A higher value implies the opposite.
      content = average pixel value of template in current
            grid_size area, normalize [0,1]
            %Determine the cell of the 6x4 missing_parts_matrix to
            which the current grid_size area (i.e. grid point) maps
      [cx,cy] = find co-ordinates of current grid point in
            missing part matrix
      remove = missing_part_matrix[cy,cx]*defect_level
      [gx,gy] = find co-ordinates of current grid point in
            pressure and noise map
            %Calculate the noise component
            (INK_STRENGTH is a predefined constant)
      noise_component = noise_level * ink_level *
            noise_map[gy,gx] * INK_STRENGTH;
            %Calculate the ink component
      ink_component = (1-content)*ink_level*(1-remove)
            %Producing the blot
            (CONTRAST_BOOST is a predefined constant)
      blot = 1-(noise_component*noise_blot[] +
            ink_component*ink_blot[])* pressure_map[gy,gx] *
            CONTRAST_BOOST
      apply blot to image
}
return image
```

FIG. 33

Ink Variation
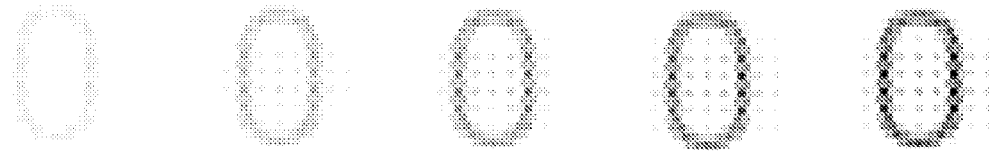
Missing Parts Variation
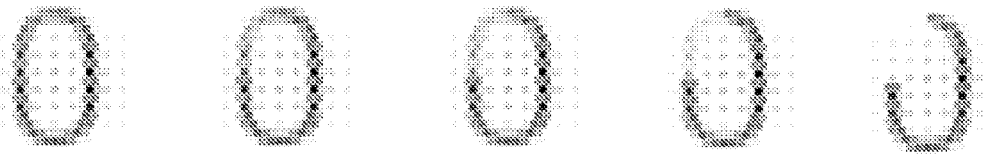
Noise Variation
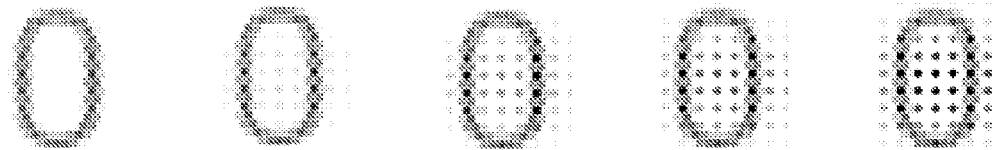
Impact Vertical Variation
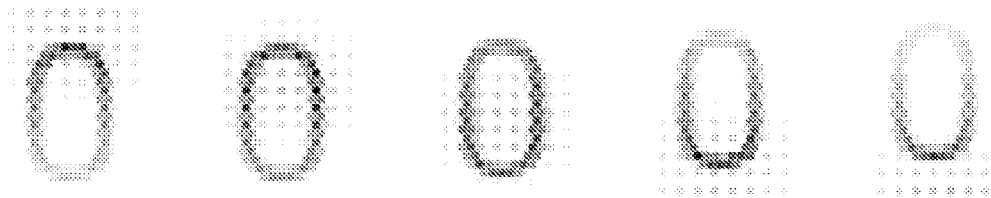
Impact Horizontal Variation
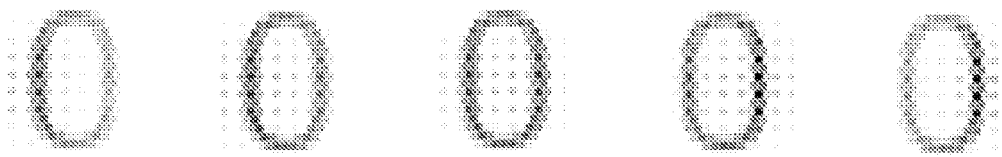
FIG. 35
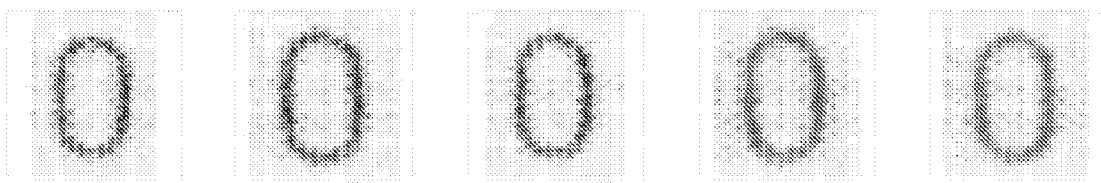
FIG. 36

METHOD FOR SIMULATING IMPACT PRINTER OUTPUT, EVALUATING PRINT QUALITY, AND CREATING TEACHING PRINT SAMPLES

BACKGROUND

1. Field of Invention

The present invention relates to the evaluation of print quality of printed documents. More specifically, it relates to the training of a machine to visually inspect print quality. It also relates to the preparation of scanned print samples for evaluation teaching purposes and to image creation of simulated print samples for teaching purposes.

2. Description of Related Art

Assuring the print quality of printers is important in many applications, and particularly important in point-of-sale (POS) commercial applications, which may provide a printed receipt for each commercial transaction. Maintaining the print reliability of such printers is vital to the smooth operation of such commercial establishments.

Often, the only way of determining the print quality of a printer is simply to visually inspect a printout made by the printer. This may be suitable for some applications, such as described in U.S. Pub. 2006/0147092 to Zhang et al., but when qualifying a potential new printer or testing its reliability/quality, it is typically necessary to evaluate a multitude of printouts by the printer being tested. Thus, it is desirable to automate at least some part of the print evaluation process, such as described by Zhang et al.

Another method of automating a print inspection is described in U.S. Pub. 2010/0039510 to Gold et al., which describes using a conveyer belt to image and evaluate specific print types of a known source.

What is needed is a method of not only identifying the text content of a printed document, but also a method of judging the print quality of the print itself. That is, it is not sufficient for an automated system to be able to recognize specific text on a printed document. Rather, it would be preferred that the automated system be cable of judging and scoring the quality of the printout. It is further desirable that the automated system identify areas of the printout that need improving in order to determine what part of a printer should be optimized. For example, it would be desirable for the evaluation to specify whether the print quality suffers due to a low ink supply, due to excessive noise scattering of ink, due to non-uniform darkness over a printed character, etc.

It is an object of the present invention to provide an automated system capable of recognizing, scoring, and categorizing different types of print defects.

It is further an object of the present invention to provide an automated system able to speed up the preprocessing of a printed document in preparation for image inspection.

It is another object of the present invention to provide a system capable of facilitating the gathering of a library of relevant training images for specific types of print errors.

SUMMARY OF INVENTION

The above objects are met in a method of distinguishing glyphs from non-glyph image artifacts in an input image, the method including: providing a data processing device to implement the following steps: defining a connectedness threshold, the connectedness threshold being a numeric value between a pre-specified numeric range; defining a numeric effort value, the effort value specifying a fixed number of repetitions; assigning foreground pixels of the input image a first connectedness value and assigning non-foreground pixels of the input image a second connectedness value; iterating steps (a) through (d), until the number of iterations matches the effort value, wherein each iteration has a corresponding and predefined scanning pattern and bit mask, the bit mask designating a center pixel location and designating neighboring pixel locations to be considered in the following steps; (a) identifying the bit scanning pattern and bit mask corresponding to the current iteration; (b) scanning for processing pixels of the current input image following the scanning pattern, and for each scanned pixel: overlaying the identified mask onto the current scanned pixel, with the current scanned pixel at the designated center pixel location of the identified mask, and assigning the current scanned pixel a center pixel connectedness measure according to the following relation: center pixel connected measure=the smaller of [(the highest connectedness value of the pixels at the designated neighboring pixel locations of the identified mask)+1] or [the input connectedness threshold]; (c) IF the number of the current iteration does not match the effort value, THEN updating the connectedness measure of each pixel in the current input image according to the following relation, IF (connected measure of pixel>0) AND (connected measure of pixel<the connectedness threshold), THEN (set connected measure of pixel=1), ELSE (leave the connectedness measure of pixel unchanged); (d) IF the number of the current iteration matches the effort value, THEN do the following for every pixel having a connectedness measure>0: IF (connected measure of pixel>connectedness threshold), THEN mark pixel as a non-glyph image artifact pixel, ELSE mark pixel as to a glyph pixel.

Preferably in this method, the pre-specified numeric range is from 2 to 254.

Also in this method, the connectedness threshold is defined as a user-provided, input numeric value.

Furthermore, the numeric effort value is preferably less than six, and further preferably the numeric effort value is four.

Additionally, each iteration of steps (a) through (d) has a unique combination of scanning pattern and bit mask distinct from all other iterations.

In a preferred embodiment, the first connectedness value and the second connectedness value are smaller than the connectedness threshold. The first connectedness value may be 1 and the second connectedness value may be 0.

In step (b) of the above method, all the pixels of the current input image are scanned for processing, pixel-by-pixel following the scanning pattern.

In step (b) of the above method, only foreground pixels of the current input image are scanned for processing.

The above method may further include, following step (d), collecting glyph pixels into a clean image representation of the input image and collecting non-glyph image artifact pixels into a defect map.

If desired, the input image may be a simulated print of an impact printer, the simulated print being created by: accessing a template image of a printable character, the template image defining an X-dimension and a Y-dimension in a Cartesian plane; accessing a grid having a fixed plurality of grid points, resizing the grid relative to the size of the template image, determining the resultant pixel dimensions of the grid points, and mapping each grid point to its corresponding area within the template image based on an alignment of the resized grid to the template image; accessing an ink_level parameter indicative of a desired ink level; accessing an impact_x parameter and impact_y parameter indicating a center of impact relative to the X-dimension and a Y-dimension; accessing a noise_level parameter indicative of a desired noise intensity; defining a 2D Gaussian filter elongated along the X-dimension as compared to the Y-dimension and centered at the center of impact, the 2D Gaussian filter defining a noise map substantially spanning the X-dimension of the template_image; applying the following steps to each grid point: (a) determining a content level for the current grid point based on the pixel values of the area of the template image corresponding to the current grid point; (b) determining a noise_component value for the current grid point, the noise component value being directly proportional to the noise_level parameter, the ink_level parameter, and the portion of the noise map corresponding to the grip point; (c) determining an ink_component value proportional to (1−the content level) and the ink_level; (d) defining a print blot in the input image within an area and location corresponding to the area and location of the grid point, wherein the defined print blot is dependent upon a combination of the noise_component value and the ink_component value.

The above objects are further achieved in a nontransitory computer readable medium embodying instructions for executing a method of simulating a print from an impact printer, the method having: accessing a template image of a printable character, the template image defining an X-dimension and a Y-dimension in a Cartesian plane; accessing a grid having a fixed plurality of grid points, resizing the grid relative to the size of the template image, determining the resultant pixel dimensions of the grid points, and mapping each grid point to its corresponding area within the template image based on an alignment of the resized grid to the template image; accessing an ink_level parameter indicative of a desired ink level; accessing an impact_x parameter and impact_y parameter indicating a center of impact relative to the X-dimension and a Y-dimension; accessing a noise_level parameter indicative of a desired noise intensity; defining a 2D Gaussian filter elongated along the X-dimension as compared to the Y-dimension and centered at the center of impact, the 2D Gaussian filter defining a noise map substantially spanning the X-dimension of the template_image; applying the following steps to each grid point: (a) determining a content level for the current grid point based on the pixel values of the area of the template image corresponding to the current grid point; (b) determining a noise_component value for the current grid point, the noise_component value being directly proportional to the noise_level parameter, the ink_level parameter, and the portion of the noise map corresponding to the grip point; (c) determining an ink_component value proportional to (1−the content level) and the ink_level; (d) defining a print blot in an output image within an area and location corresponding to the area and location of the grid point, wherein the defined print blot is dependent upon a combination of the noise_component value and the ink_component value.

In step (b) of this method, the noise component is determined as (noise_level parameter)*(ink_level parameter)*(the portion of the noise map corresponding to the grip point)*(an ink_strength value).

This method may further include: defining an ink blot of size matching that of a grid point, the ink blot being defined by means of a Gaussian function; defining a noise blot from a circle shape, the noise blot having a dimension matching the ink blot; and defining a pressure map from a 2D Gaussian of equal size as the template image; wherein in step (d), the print blot is defined as: 1−(noise_component value)*(noise blot)+(ink_component value)*(ink blot)*(the area of pressure map that corresponds to the area of the grid point)*(a contrast_boost value).

This method may further include: accessing a missing_parts_matrix and fitting the missing_parts_matrix over the template image, each cell of the missing_parts_matrix having one of a first indicator value or second indicator value, wherein the first indictor value within a cell is indicative that fading is to be applied to the area of the template image corresponding to the cell, and wherein the second indictor value within a cell is indicative that fading is not to be applied to the area of the template image corresponding to the cell; accessing a defect_level parameter indicative of the amount of fading applied to the template image, the defect_level parameter being within the range from 0 to 1, wherein 0 correspond to no fading being applied and 1 corresponds to a maximum amount of fading; wherein: in step (a), the content level is defined as the average pixel value of the area of the template image corresponding to the current grid point, normalized between 0 and 1, with lower values indicating a darker imprint; and in step (c), the ink_component value is determined to be (1−the content level)*the ink_level*(1−(the indictor value of the cell of the missing_parts_matrix that coincides to the position of the grid point)*(defect_level parameter).

In this case, the missing_parts_matrix and defect_level parameter may be user-configurable via a graphics user interface (GUI).

This method may further include: combining the output images with scan images of real printouts by physical impact printers into a sample set of training images; submitting the sample set of training images to human inspectors for human evaluation scoring, the human evaluation scoring providing score values to each of the ink_level parameter, impact_x parameter, noise_level parameter, defect_level parameter, and adjusting the ink_level parameter, impact_x parameter, noise_level parameter, defect_level parameter to bring their human evaluation scoring within a specified range; submitting the sample set of training images to an automated visual inspection process for automated scoring according to a list of defect parameters; comparing the automated scoring results to the human evaluation scoring, and adjusting the defect parameters so that the results of the automated visual inspection process renders automated scores within a predefined range from human evaluation scores from average human inspectors.

This method may further have prior to step (a): accessing a ribbon_x parameter introducing an alignment offset of the resized grid to the template image in the X-dimension relative to the template image; and accessing a ribbon_y parameter introducing an alignment offset of the resized grid to the template image in the Y-dimension relative to the template image.

Additionally in this method, the template image, ink_level parameter, impact_x parameter, and noise_level parameter may be user provided inputs.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 6-18 illustrate the processing of a simplified sample input image 71 to Quick Object Labeling in Clutter Image module 41 of FIG. 3.

FIGS. 24A to 24C show additional experimental results.

FIGS. 25A to 25C show still additional experimental results.

FIG. 33 is pseudo code summarizing the preferred process for simulating a printable character.

FIG. 35 illustrates sample images of refined results with various parameter settings.

FIG. 36 shows several real, high-resolution scans of simulated printouts.

FIGS. 39A to 39C are examples of sample receipts/images presented to human inspectors in the process of optimizing the present automated POS print inspection system.

DESCRIPTION OF THE PREFERRED EMBODIMENTS

The following provides details of various image processing components and techniques, and in particular, as they may be applied to print quality assessment (i.e. print inspection). The exemplary print quality assessment system/method detects and measures the quality of symbology (i.e. printable symbols, such as Western print characters and/or Eastern print characters and/or other glyphs) present in printed materials. The present system/method further uses feedback received from human inspectors for optimization and inconsistency analysis. As an example of a specific use of the present system/method, a description of a preferred embodiment as applied to the inspection of Point-of-Sale (POS) printed documents (for example, commercial transaction receipts produced by a cash register at a retail store) is presented, but it is to be understood that the present system/method is equally applicable to other print quality assessment scenarios.

Figure 1:
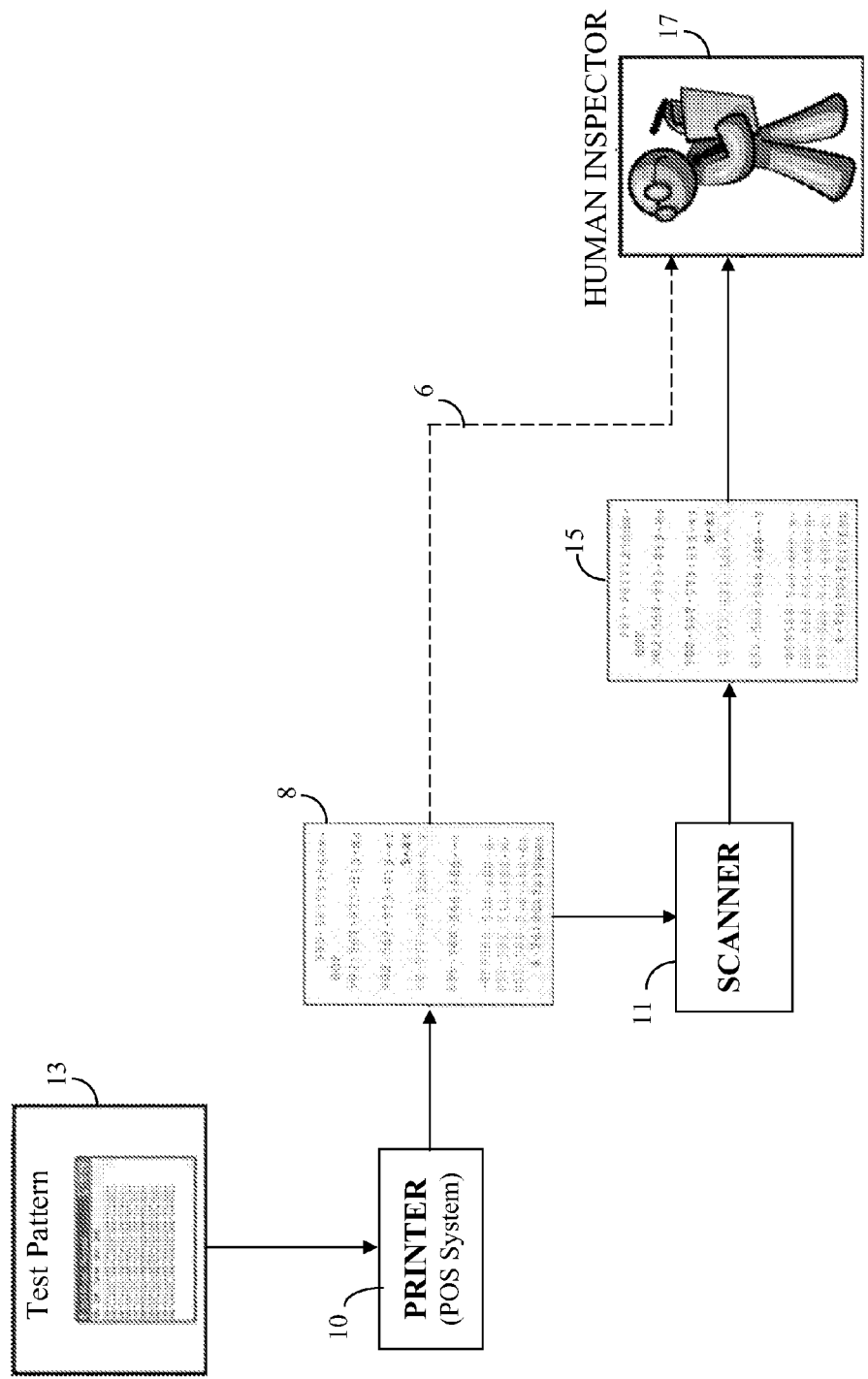
FIG. 1 illustrates a simplified process flow of an exemplary system.

A symbolic representation of a simplified process flow of the present exemplary system is illustrated in FIG. 1. In the present example, it is desired to evaluate the print quality of POS printer 10 (i.e., the printer under inspection). Thus, one would first submit a known test pattern 13 (i.e. a predefined symbology pattern) to POS printer 10 for printing, which produces a printed document 8 for assessment (i.e., produces a printed document under test, printed DUT 8). Printed DUT 8 could then be submitted to one or more human inspectors 17 for visual assessment, i.e. evaluation, as illustrated by dotted arrow 6. However, it is preferred that the printed DUT 8 be scanned, as illustrated by scanner 11, to produce a scanned document under test (i.e. scanned DUT) 15, i.e. a digital/soft copy of printed DUT 8. This permits quicker and easier distribution of the printout under inspection to a plurality of human inspectors 17. Alternatively, printed DUT 8 may be distributed sequentially to each of multiple human inspectors 17, one-by-one. A less desirable alternative may be to make multiple printed documents of test pattern 13, so as to make a separate printed DUT 8 for each of a plurality of human inspectors 17.

For ease of discussion, the document under test that is representative of the print output from printer 10 may be identified simply as DUT, irrespective of whether it is printed DUT 8 or scanned DUT 15, unless stated otherwise.

Under typical circumstances, one or more human inspectors 17 would visually inspect a DUT and provide a subjective assessment of its print quality, and preferably provide an assessment of each individual, printed character within the DUT. Depending on the print quality of the DUT, human inspectors 17 might need to reference test pattern 13 as part of their visual evaluation.

As it would be understood, the results of these evaluations are subjective and highly dependent upon the whim of each individual human inspector. As a result, the evaluation of any given parameter (or of a specific character) within a DUT may vary widely, but given a large enough population of human inspectors 17, the evaluation results will generally follow a statistically normal distribution with a majority of evaluation results for a given parameter clustering about a given range. Statistical analysis of the evaluation results of the entire population of human inspectors 17 may also be used to remove extremes in the evaluation results (i.e. remove outliers).

Figure 2:
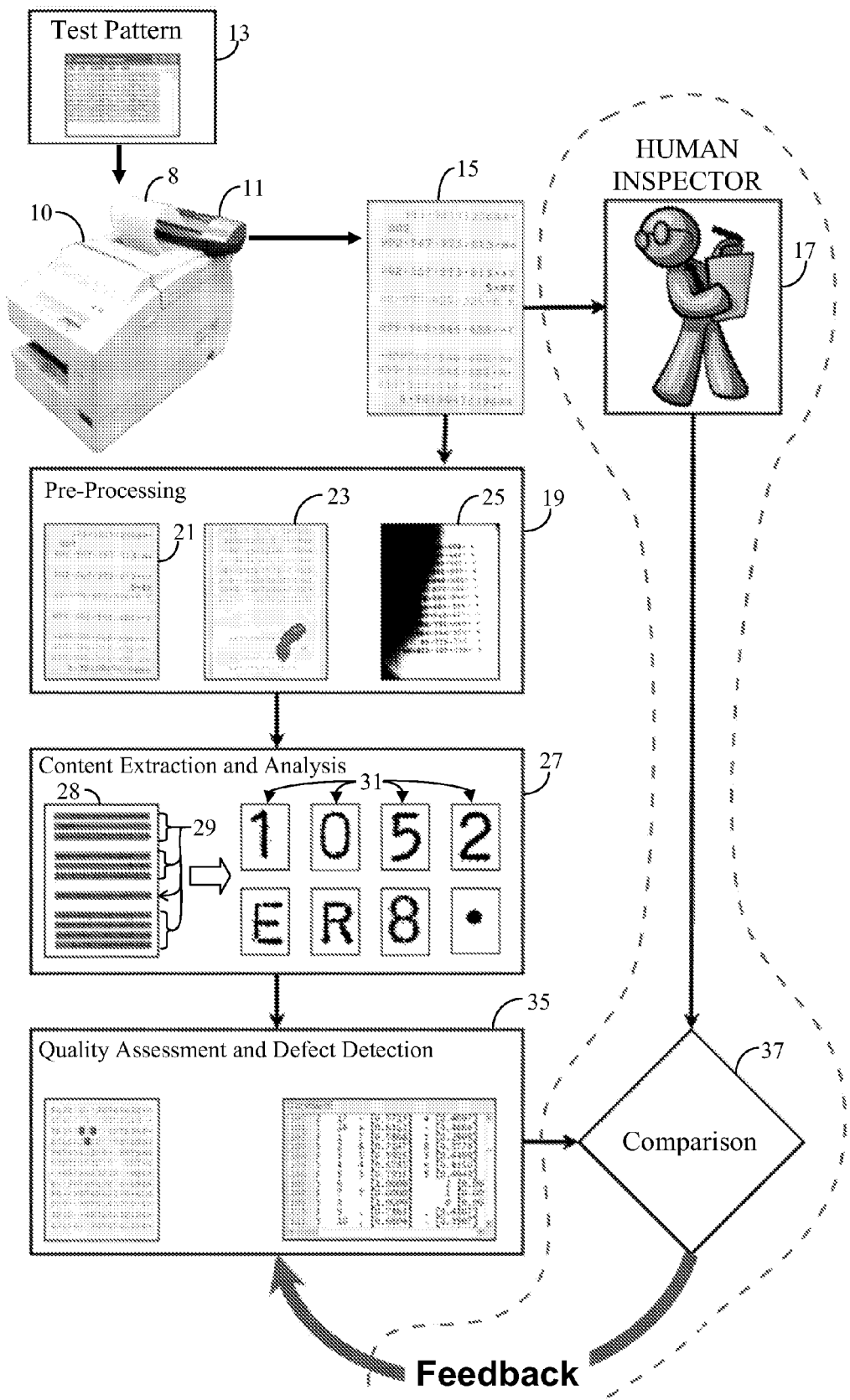
FIG. 2 is an automated print quality assessment process in accord with present invention.

Nonetheless, this process can be relatively slow and costly. It is desirable to augment, or replace, this human evaluation with an automated print quality assessment process, method, or system. To achieve this, it is necessary to teach a machine to assess a printed document and to render results consistent with those of human inspectors 17. As illustrated in FIG. 2, this would include comparing the evaluation results obtained by the automated assessment process with the assessment results from human inspectors, and adjusting test parameters of the automated process until it rendered assessment results consistent with those of the human inspectors.

With reference to FIG. 2 where all elements similar to those of FIG. 1 have similar reference characters and are described above, a test pattern 13 is submitted to POS printer 10, and its printed DUT 8 is directly submitted to scanner 11 to produce scanned DUT 15. In the present example, scanned DUT 15 is submitted to multiple human inspectors 17 and to a Pre-Processing module 19 for image/data processing. It is to be understood that scanned DUT 15 would be scanned at a resolution dependent upon the test procedure for a given application.

Scanned DUT 15, i.e. the input image to Pre-Processing module 19, is passed through a number of pre-processing stages. In the case of POS printer assessment (i.e. POS print quality evaluation), an appropriate set of pre-processing stages (not in any particular order) may include color conversion and skew compensation (illustrated by image 21), scratch detection and correction (illustrated by image 23), and binarization (i.e. conversion to a binary black-and-white image, as illustrated by image 25). The flexibility of the present automated print quality assessment process/system and its sensitivity to imaging conditions are dependent upon the number and sophistication of the pre-processing stages that prepare scanned DUT 15 in order to determine how well it matches up to multiple predefined models used later in the process/system.

The output of the Pre-Processing module 19 is fed to a Content Extraction and Analysis module 27 as image 28. In the presently preferred embodiment, the content present in image 28 consists of glyphs comprising printable symbols (such as Western and/or Eastern print characters). Since the present example is for POS printer assessment, it is assumed that these symbols are alphanumeric characters (i.e. text).

These characters are grouped into horizontal (or vertical) bands, as illustrated by darken rows 29. Isolation of the bands, and subsequent extraction of printed characters (i.e. extracted symbols 31) from bands 29, may be carried out by searching for the areas in image 28 that contain the most printed content. The output of Content Extraction and Analysis module 27 is a buffer of extracted symbols 31 accompanied with descriptive parameters, such as each extracted symbol's corresponding position within image 28 and/or potential orientation and/or other geometric parameters. Furthermore, a number of quality indicators (i.e. fidelity metrics) may be measured for each extracted symbol 31 in image 28. In the case of POS printer assessment (i.e. visual inspection of a printout), such quality indicators may include the darkness of the symbols, noise level in their surrounding background area, and/or parts missing from (or extra parts in) the symbols. The two latter fidelity metrics may be measured by comparing the detected content (i.e. extracted symbols 31) with their corresponding symbols in test pattern 13.

The resultant buffer of the extracted symbols produced by Content Extraction and Analysis module 27 is passed to a Quality Assessment and Defect Detection module 35, which provides a print quality assessment for POS printer 10. The geometric information extracted from image 28 is processed into global and local measures such as rotation and character displacement in each band 29 as well the variations in character pitch, among other measures. These metrics are compared against pre-set threshold values in order to produce defect detection flags that are raised if a metric indicates a variation from the model that exceeds a predefined acceptable range. The presently preferred process/system provides the defect detection data for further analysis as well as a number of visualizations that facilitate the examination of the sanity (i.e., efficacy) of the automated print quality assessment process.

The print evaluation output generated by the Quality Assessment and Defect Detection module 35 (i.e. automated scoring) is then compared against the print evaluation provided by the human inspectors 17 (i.e. human evaluation scoring), as illustrated by processing block 37. Through this process, the accuracy of the developed automated print quality assessment process/system is evaluated. The input from the human inspectors (i.e. their print evaluations) are also important in setting the thresholds and the coefficients described above, as illustrated by feedback path 39 and explained more fully below. Details of the involvement of human inspectors 17 in the development of the automated print quality assessment process of the present embodiment are presented below.

As is explained above, the overall effectiveness of the present system is dependent upon the effectiveness of each of Pre-Processing module 19, Content Extraction and Analysis module 27, and Quality Assessment and Defect Detection module 35. Therefore, some innovative features of these modules are also discussed.

Detection, measurement, and subsequent size-based categorization of the objects (i.e. printed elements, or glyphs) present in a binary image, as described in connection with Pre-Processing module 19, are typical pre-processing stages in many image processing and machine vision applications. The typical approach toward achieving this is to create a list of all the objects present in a given input image. This list can be aggregated through multiple executions of a recursive connected-component detection algorithm, which makes the approach relatively slow and dependent upon the number of objects in the image. Additionally, cluttered images (images with many objects or non-white pixels covering a majority of the input image, such as printed receipts) can place heavy memory requirements on algorithms implementing this approach. Further burdening this approach is that cluttered images may often have isolated image artifacts that are of no interest to a human observer, but which nonetheless place an added load on the algorithm.

Figure 3:
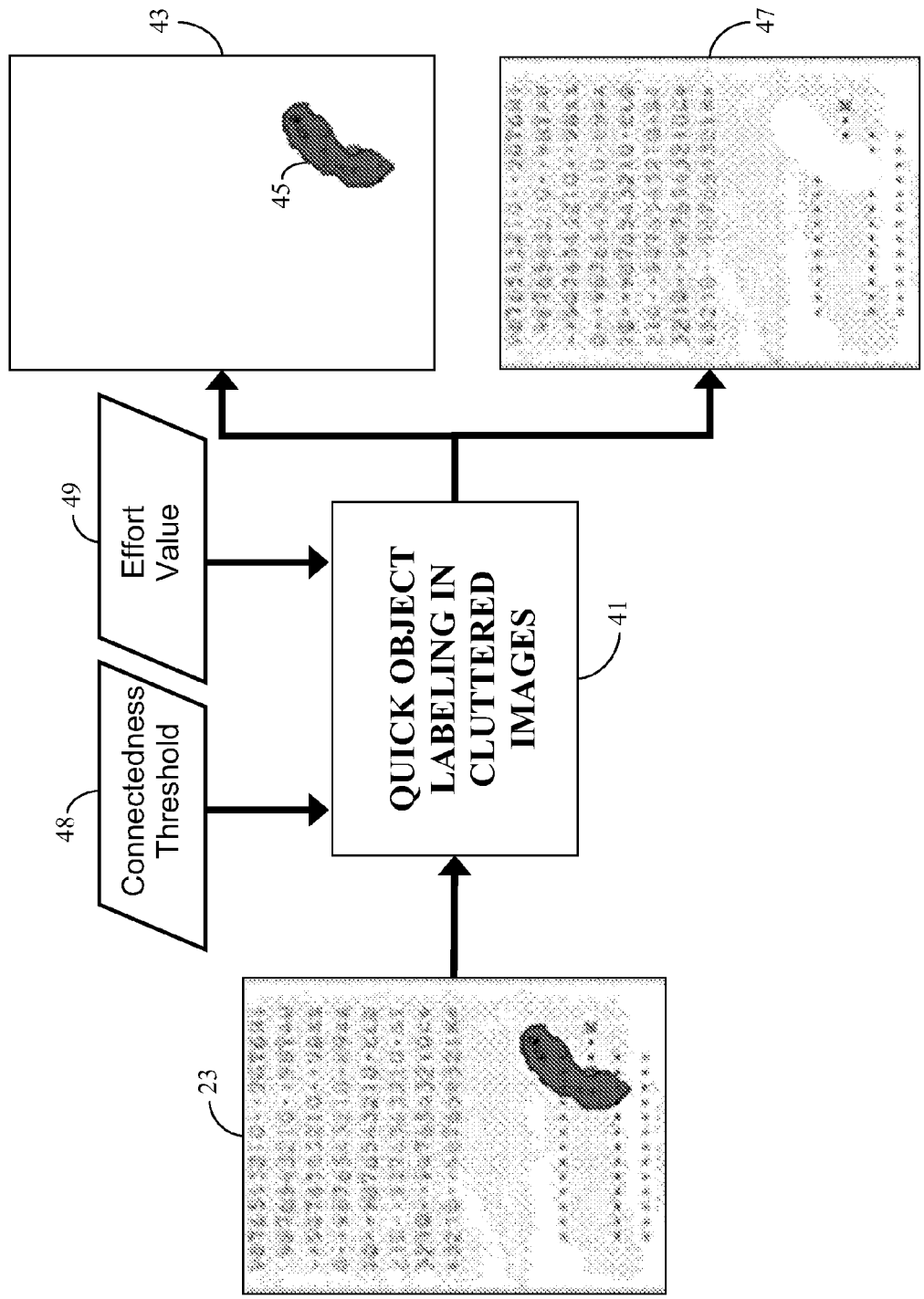
FIG. 3 provides as system for quick differentiation of glyph items from non-glyph image artifacts.

Quick object labeling in cluttered images, and in particular removing scratches and other external objects (i.e. non-glyph image artifacts) from the input image are key features of Pre-Processing module 19. With reference FIG. 3, a preferred method in accord with present invention overcomes the above-listed shortcomings by means of a Quick Object Labeling in Clutter Images module 41 that receives an input image (such as image 23) and obtains an approximate on-the-fly measure of connectedness for each pixel in input image 23 by means of a predefined, or user-provided, connectedness threshold 48. The preferred method then uses this connectedness measure to output a defect map 43 noting the scratches and other external objects 45, and outputs a cleaned image 47 with the noted scratches and other external objects removed. Preferably, the determined measure of connectedness for each pixel is aggregated and made more accurate by Quick Object Labeling in Clutter Image module 41 repeating its process a pre-specified number of times, which may be specified by input effort value 49. Further preferably, within each repetition of its process, the image being processed is scanned in a different scanning direction using a correspondingly unique pixel mask.

For convenience, each repetition, or pass, of this process is herein called a "stage" and the maximum number of stages (or repetitions) permissible is called the "effort". That is, the number of repetitions is not determined by a recursive operation nor is it dependent upon the number of objects in the image. Rather, the number of repetitions is fixed and pre-specified (or user provided) as input effort value 49, whose value can be determined by experimentation. It has been found that a relatively low effort value will yield high precision results.

The connectedness measure of each foreground pixel is determined by scanning a working image, pixel-by-pixel, and for each scanned foreground pixel, using a mask to determine which of its neighboring pixels are used in the calculation of its connectedness measure, as is explained more fully below.

It is to be understood, however, that the only pixels for which connectedness measures are determined are preferably those identified as foreground pixels. Thus, the term pixel-by-pixel scanning can optionally interpreted as either a literal pixel-by-pixel scanning (with the added step of disregarding all non-foreground pixels) or as a "foreground pixel"-by-"foreground pixel" scanning. In either case, however, the working image is preferably scanned in a different direction and using a different mask in each stage.

Figure 4:
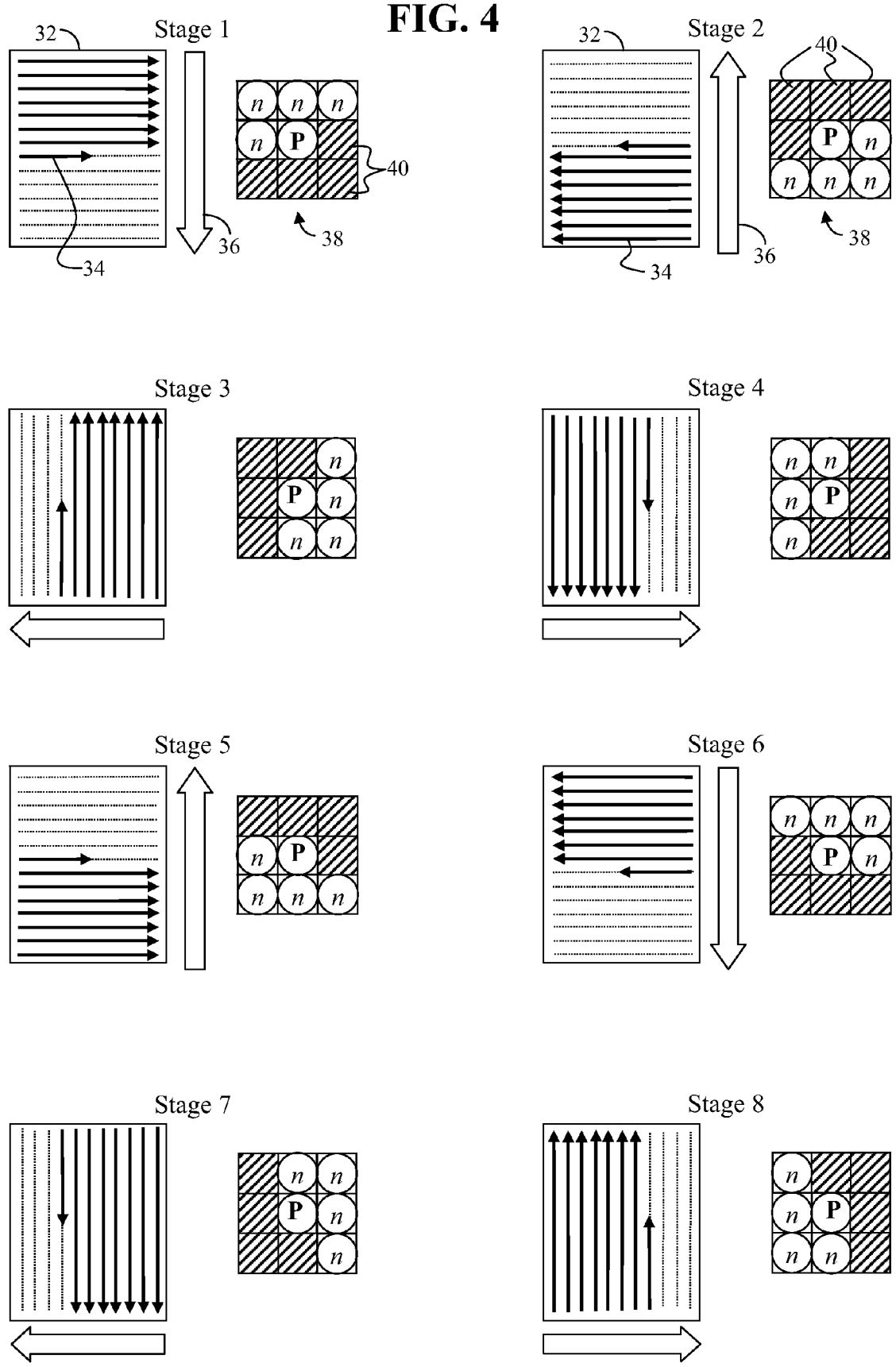
FIG. 4 illustrates a series of exemplary scanning directions and corresponding masks for use in each of eight stages of the system of FIG. 3.

FIG. 4 illustrates a series of exemplary scanning directions and corresponding masks for use in each of eight stages (or repetitions) labeled Stage 1 through Stage 8. In stage 1, pixels within a working image 32 are scanned row-by-row from left-to-right, as illustrated by the series of black arrows 34, starting from the top of working image 32 and going downward, as illustrated by the white arrow 36. The preferred mask 38 for Stage 1 consists of neighboring pixel in a radial direction at a distance of one pixel location surrounding a center pixel P, which represents the foreground pixel whose connectedness measure is being determined. As shown, mask 38 indicates which of the neighboring pixel location (or pixels) are considered in the determination of the connectedness measure of center pixel P, and which neighboring pixels are ignored in determination of this measure. In the present example, neighboring pixels that are masked out (i.e. not considered in the calculation of the connectedness measure of center pixel P) have their positions illustratively covered (or darkened) by a series of hatch lines 40. By contrast, neighboring pixels n that are considered in the determination of the connectedness measure of center pixel P are identified by white circles.

Similarly in Stage 2, the second stage (i.e., the second iteration or repetition), pixels of working image 32 are scanned row-by-row from right-to-left, as illustrated by black arrows 34, starting from the bottom of working image 32 and going upward, as illustrated by the white arrow 36. The preferred mask 38 for Stage 2 is as illustrated, with pixels that are considered in the determination of the connectedness measure of center pixel P being labeled n, and pixels that are not considered being covered by hatch lines 40.

The scanning directions and corresponding masks for Stage 3 through Stage 8 are similarly illustrated in FIG. 4. Stage 3 preferably scans pixels-by-pixel along columns from bottom-to-top, and column-by-column from right-to-left. Stage 4 preferably scans pixels-by-pixel along columns from top-to-bottom, and column-by-column from left-to-right. Stage 5 preferably scans pixels-by-pixel along rows from left-to-right, and row-by-row from bottom-to-top. Stage 6 preferably scans pixels-by-pixel along rows from right-to-left, and row-by-row from top-to-bottom. Stage 7 preferably scans pixels-by-pixel along columns from top-to-bottom, and column-by-column from right-to-left. Stage 8 preferably scans pixels-by-pixel along columns from bottom-to-top, and column-by-column from left-to-right.

Figure 5:
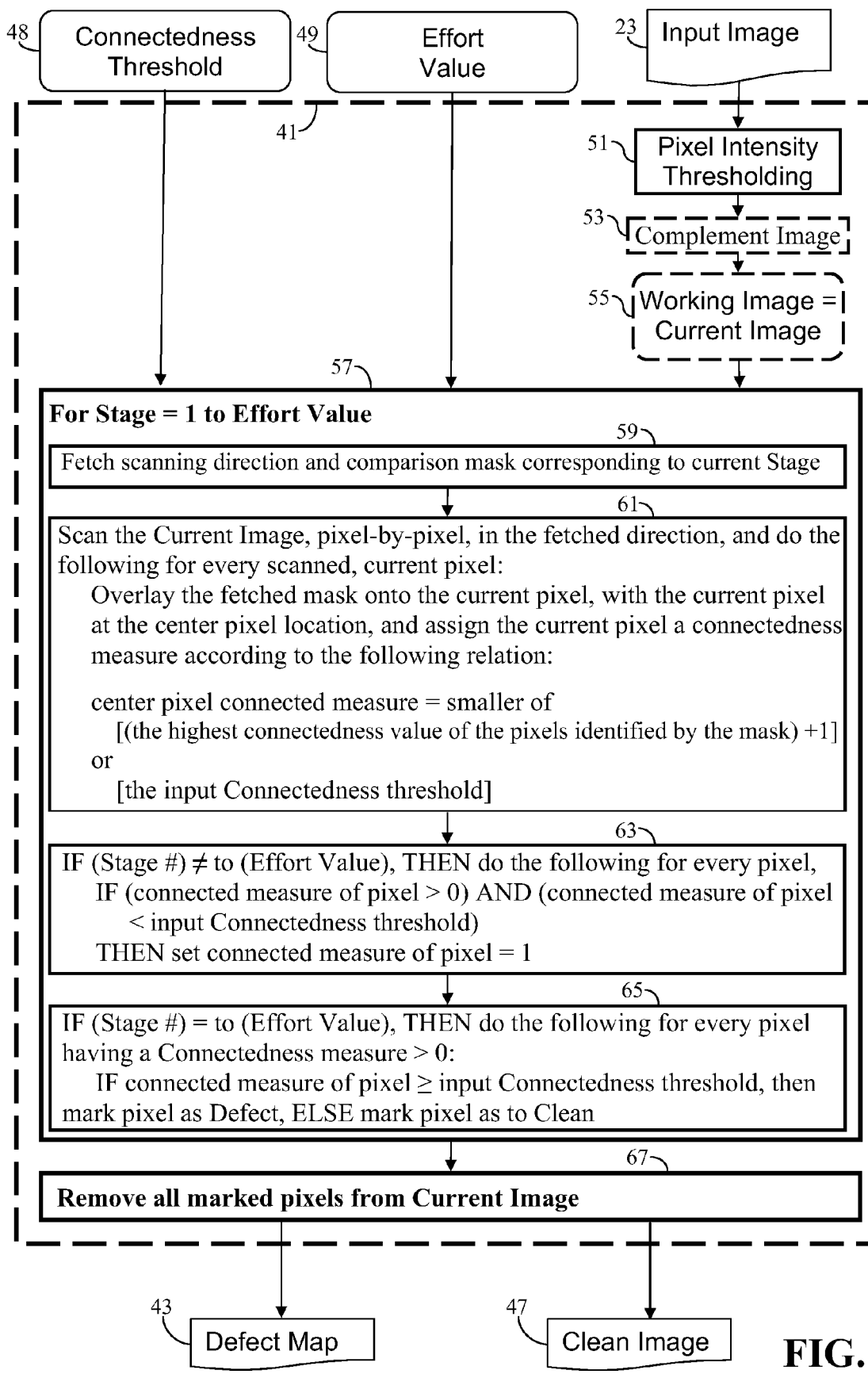
FIG. 5 is a more detailed description of the preferred process implemented by Quick Object Labeling in Clutter Image module 41 of FIG. 3.

A more detailed description of the preferred process implemented by Quick Object Labeling in Clutter Image module 41 is provided in FIG. 5, where all elements similar to those of FIGS. 1-4 having similar reference characters and are discussed above. Connectedness threshold 48, effort value 49, and input image 23 are supplied to Quick Object Labeling in Clutter Image module 41, which outputs defect map 43 and cleaned image 47 in accordance with the inputs. The process of module 41 has been shown to be fast, and to minimally require only enough memory space to fully hold (i.e. complete store) input image 23.

Effort value 49 is preferably any positive numeric value, but a typical numeric value for effort value 49 is four. The numeric value of connectedness threshold 48 is more closely related to the resolution and content type of input image 23, but is preferably set between 2 and 254. For example, for an input image 23 having text scanned at 600 DPI (dots per inch), a connectedness threshold of 200 is typical.

With reference to FIG. 5, input image 23 is preferably first submitted to pixel intensity thresholding module 51 to label foreground and background pixels (i.e. to differentiate foreground pixels from background pixels). As it is known in the art, foreground pixels typically have a higher intensity (of light or color) than do background pixels. Therefore, an effective method of identifying foreground pixels is to compare each pixel of input image 23 to a predefined intensity threshold. Thus, pixel intensity thresholding module 51 converts input image 23 into a binary image (i.e. black-and-white image) by comparing each pixel's intensity (light or color) value with a predefined threshold, and assigning each pixel a logic "1" or logic "0" in accordance with the comparison result. Optionally, the output of pixel intensity thresholding module 51 may be applied to complement image module 53, which inverts the logic "1" and "0" assignments. Complement image module 53 is optional since the objective is to identify, or otherwise differentiate, foreground pixels from background pixels, and how one chooses to label foreground and background pixels is a design choice.

To facilitate discussion of later steps in the process/system, optional step 55 identifies the image that has its foreground pixels differentiated from background pixels as the "working image". During each stage (i.e. iteration), the term "working image" (or current input image) herein refers to the current state of the image being processed.

Working image 55, connectedness threshold 48 and effort value 49 are submitted to module (or data processing block) 57, which repeats steps 59-65 in each of separate Stages 1, 2, 3, and so on, up to the number specified by effort value 49. An initial step 59 is to fetch the scanning direction and comparison mask corresponding to current Stage number, as illustrated in FIG. 4 and explained above. Next, step 61 scans the current image (i.e. the working image) pixel-by-pixel, in the fetched scanning direction. The fetched mask is overlaid on each currently scanned pixel, with the currently scanned pixel at the mask's center pixel location. The currently scanned pixel is then assigned a connectedness measure value equal to either [(the highest connectedness value of the pixels identified by the mask)+1] or [the input Connectedness threshold 48], whichever is smaller. As it would be understood, if both are the same value, then the value remains effectively unchanged. That is, if both are the same, the pixel retains the value of connectedness threshold 48. This process is described in more detail below.

Step 63 determines if steps 59-65 have been repeated the prerequisite number of times specified by input effort value

49. That is, if the current Stage number does not match the input effort value, then steps 59-65 have not yet been repeated the number of times specified by effort value 49, and the working image is prepared for another iteration. The working image is prepared by resetting (i.e. setting equal to "1" in the present example) all non-zero connectedness measure values smaller than the specified connected threshold 48.

However, if steps 59-63 have been repeated the specified maximum number of times (i.e. if the current Stage number matches input effort value 49), as determined by step 65, then all pixels having non-zero connectedness measures smaller than the specified connectedness threshold 48 are marked (i.e. labeled or otherwise identified) as "Clean" pixels (or glyph pixels, i.e. pixels that are part of glyph, or printable character), and all pixels whose connectedness measures are not smaller than the connectedness threshold 48 are marked (i.e. labeled) as "Defect" pixels (or non-glyph image artifact pixels), and processing proceeds to module (or data processing block) 67.

Module 67 removes and separates, all "marked" pixels (i.e. Clean pixels and Defect pixels) into a first file containing the pixels marked as Clean, which constitutes Clean image 47, and into a second file containing the pixels marked as Defect, which constitutes Defect map 43.

Figure 6:
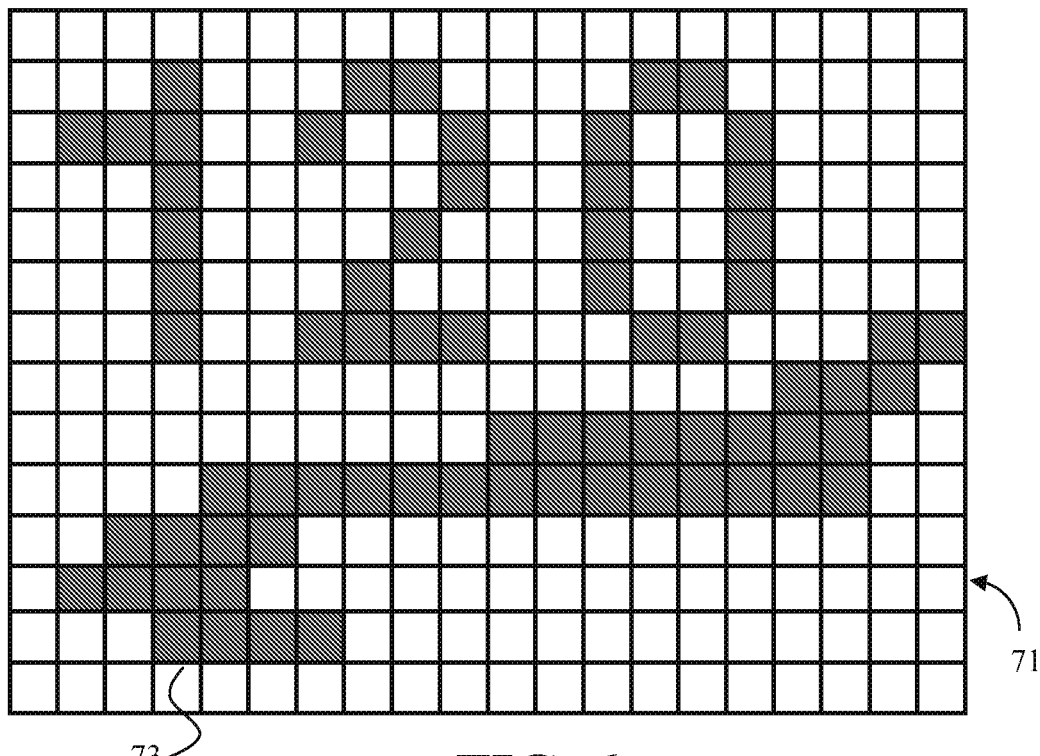

FIGS. 6-18 illustrate the processing of a simplified input image 71 to Quick Object Labeling in Clutter Image module 41. With reference to FIG. 6, simplified input image 71 is herein illustrated to be a 14×20 pixel image, with each pixel location illustratively shown as a square (or point) of a grid. Simplified input image 71 contains digits 1, 2, and 0 as shown, and an unwanted image artifact 73 (such as a scratch) across the image. The present example assumes that the input connectedness threshold 48 has a value "12", and the input effort value 49 is set to "4."

Figure 7:
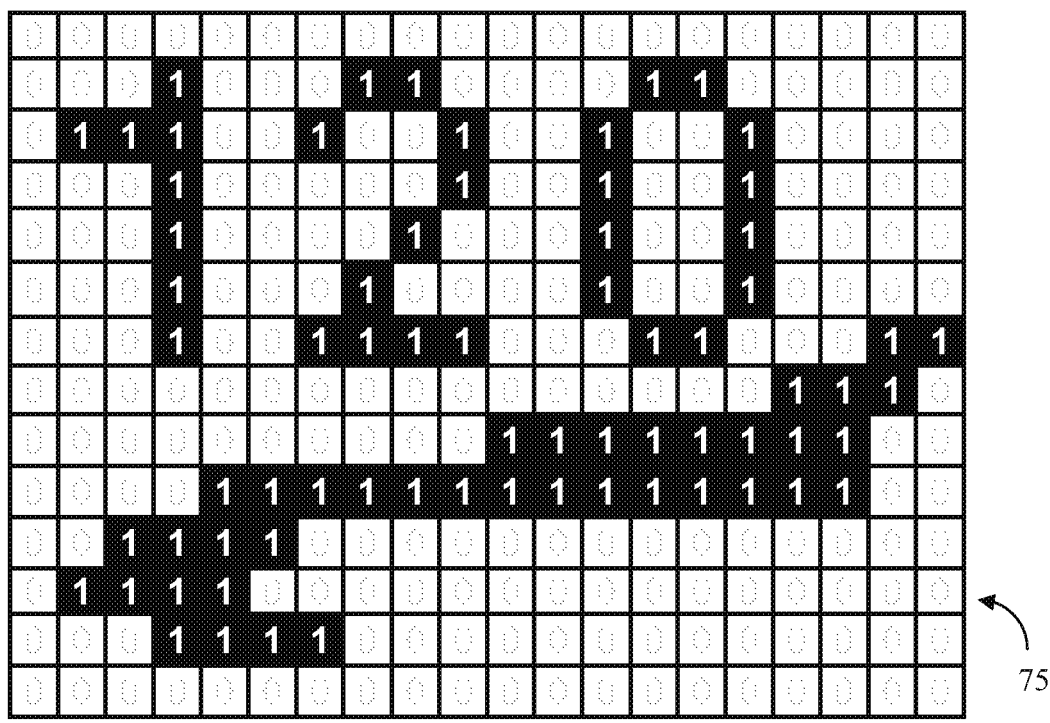

As described above, simplified input image 71 would first be submitted to pixel intensity thresholding module 51, which differentiates the foreground pixels from the background pixels. Preferably, complement image module 53 receives the output from pixel intensity thresholding module 51, and assigns an initial connectedness measure of 1 to foreground pixels, and assigns a connectedness measure of 0 to background pixels, as illustrated in FIG. 7. Image 75 would be the working image submitted to module 57.

In the first pass through module 57, the Stage value is set to 1, and the module 59 fetches the scanning direction and mask corresponding to Stage 1, as illustrated in FIG. 4 and in FIG. 8. Module 61 would then start assigning a connectedness measure value to each pixel (scanned in the corresponding direction), as dictated by the fetched mask. When a pixel is scanned, it is placed in the center location of its corresponding mask (indicated by an X in FIG. 8), and the connectedness measures of the pixels at location indicated by white circles would be inspected.

For example looking to at the third scanning row down from the top of working image 75, the first foreground pixel is pixel 77. All pixel locations corresponding to the white circles of the mask have connectedness measures of "0", and thus their highest individual connectedness measure is "0". In accordance with module 61, a value of "1" is added to this highest connectedness measure resulting in an interim value of "1". This value is compared to the input connected threshold value of "12". The smaller of these two values is "1", and so pixel 77 is assigned a connectedness measure of 1.

Similarly, when the next pixel along the same third row (pixel 79) is scanned, the highest individual connectedness measure of pixels corresponding to the white circles of the mask is "1". Again, module 61, would add a value of "1" this highest connectedness measure of "1", resulting in an interim value of "2". This interim value is compared to the input connected threshold value of "12". The smaller of these two values is "2", and so pixel 79 is assigned a connectedness measure of 2.

Continuing with the next pixel 81, in this case, the highest individual connectedness measure of the pixels corresponding to the mask is "2". Again, module 61, adds a value of "1" to this highest connectedness measure of "2", resulting in an interim value of "3". This interim value is compared to the input connected threshold value of "12". The smaller of these two values is "2", and so pixel 81 is assigned a connectedness measure of "3".

Following this example to pixel 83 in the 10th row down from the top, the pixels to be considered according to the mask have individual connectedness measures of 11, 5, 6, and 7. In this case, the highest individual connectedness measure is 11. Again, a value of "1" is added to this highest connectedness measure resulting in an interim value of "12". In the present example, the connectedness threshold is also "12", and the smallest value obtainable comparing these two values is also "12". Thus, a connectedness measure of "12" is assigned to pixel 83.

Looking at the next pixel 85 along this same row, the highest connectedness measure to be considered according to the mask is "12". Adding "1" to "12" results in an interim value of "13". However in this case, the connectedness threshold value of "12" is smaller and so pixel 85 is assigned a connectedness measure of "12".

All pixels in working image 75 are assigned a connectedness value in a similar manner.

Once all pixels have been assigned a connectedness measure, module 63 determines if the current stage value matches input effort value 49. Since this is Stage 1, and the input effort value is "4", working image 75 is reset for another iteration. As is explained above, this is done by assigning a connectedness measure of 1 to all pixels having a connectedness measure greater than "0" and lower than the connectedness threshold (i.e. lower than "12"). All other pixels are left unaltered. This results in working image 87, shown in FIG. 9.

Figure 10:
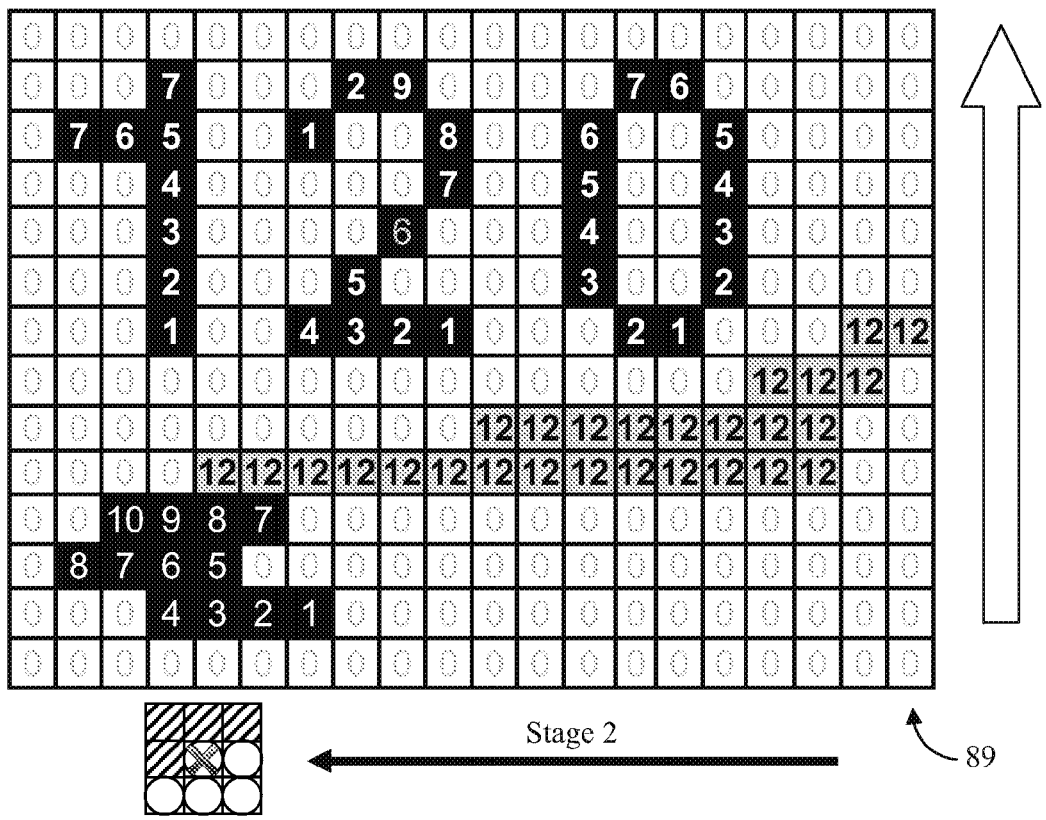
Figure 11:
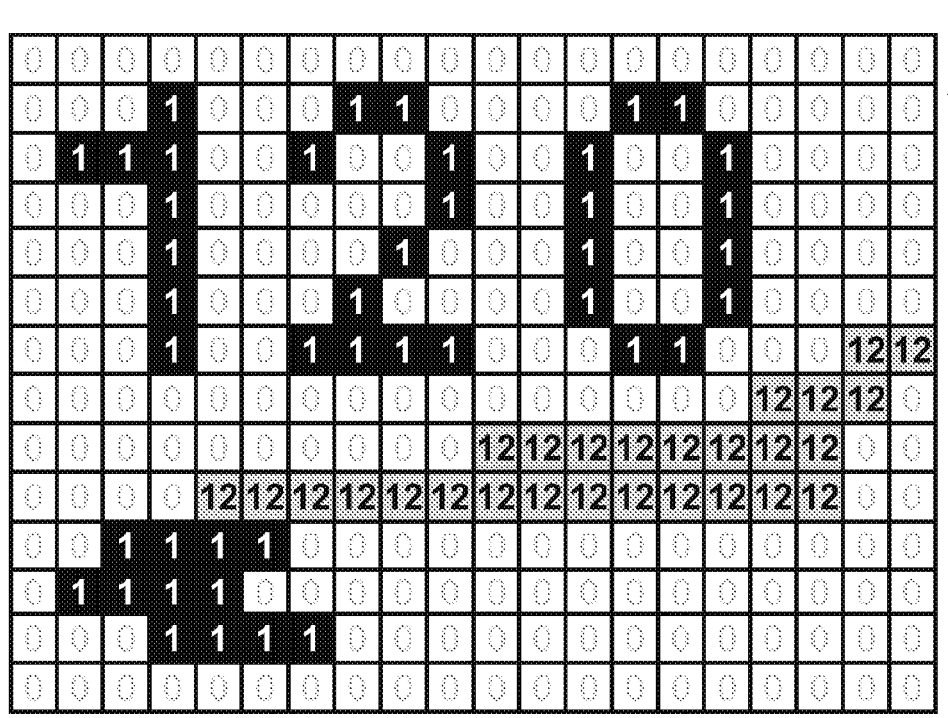

Since Stage 1≠4, module 65 does not alter working image 87, and the unaltered working image 87 is submitted to module 59 for a second iteration. As before, module 59 retrieves the scanning direction and mask corresponding to Stage 2, as illustrated in FIGS. 4 and 10, and module 61 determines connectedness measures for the pixels, as described above, resulting in working image 89.

Since the stage number (i.e. 2) still does not match the input effort value (i.e. 4), module 63 again resets working image 89 in preparation for another iteration. As before, this is done by assigning a connectedness measure of 1 to all pixels having a connectedness measure greater than "0" and lower than the connectedness threshold. All other pixels are left unaltered. This results in working image 91, shown in FIG. 11.

Figure 12:
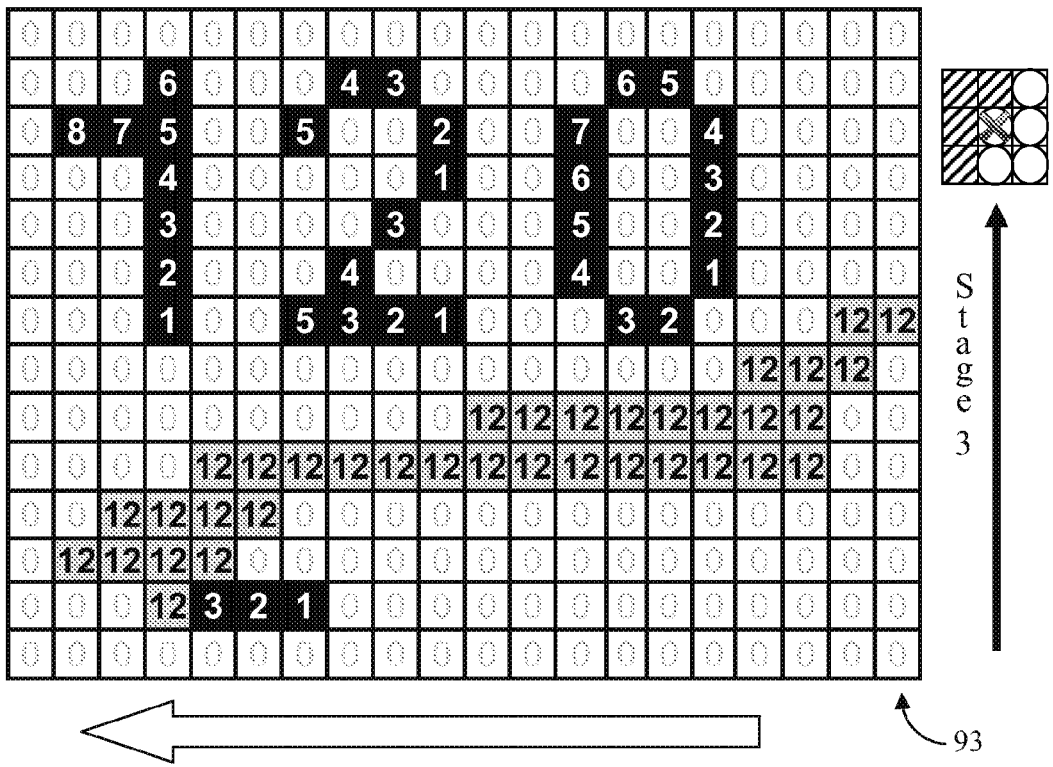

Module 65 again determines that the effort value has still not been reached, and the unaltered working image 91 is submitted to module 59 for a third iteration (i.e. Stage 3). As before, module 59 retrieves the scanning direction and mask corresponding to Stage 3, as illustrated in FIGS. 4 and 12, and module 61 determines connectedness measures for the pixels, as described above, resulting in working image 93.

Figure 13:
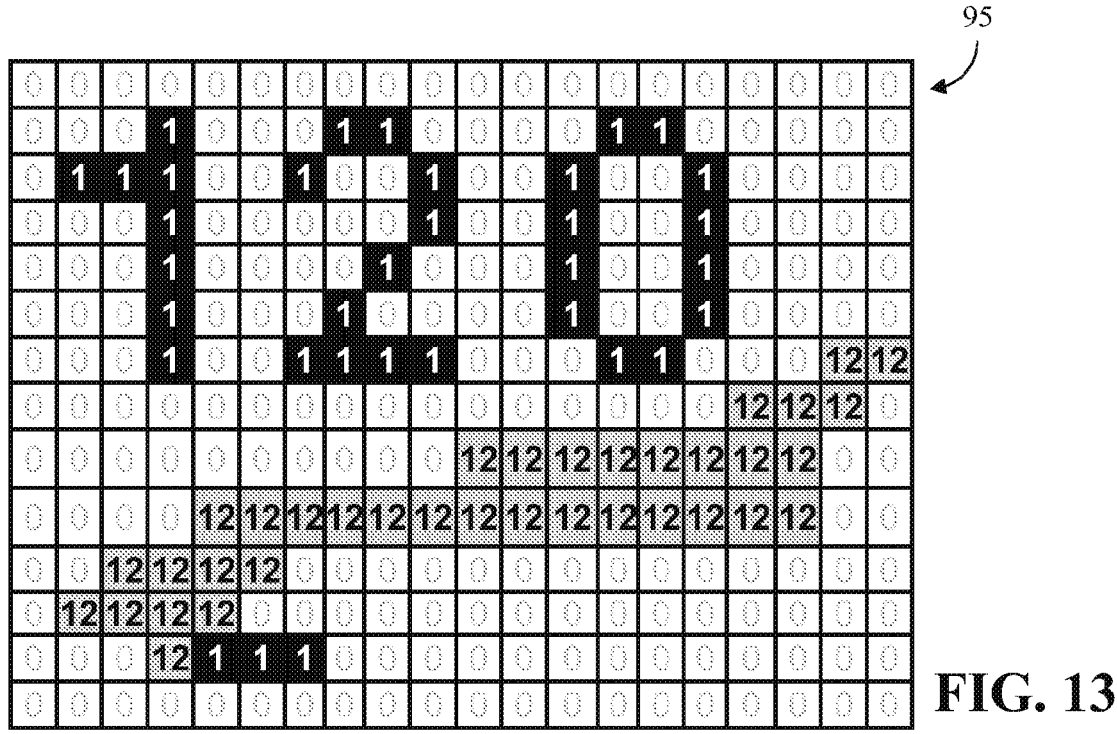

Since Stage 3 still does not match effort value "4", module 63 again resets working image 93 in preparation for yet another iteration, as described above, resulting results in working image 95, shown in FIG. 13.

Figure 14:
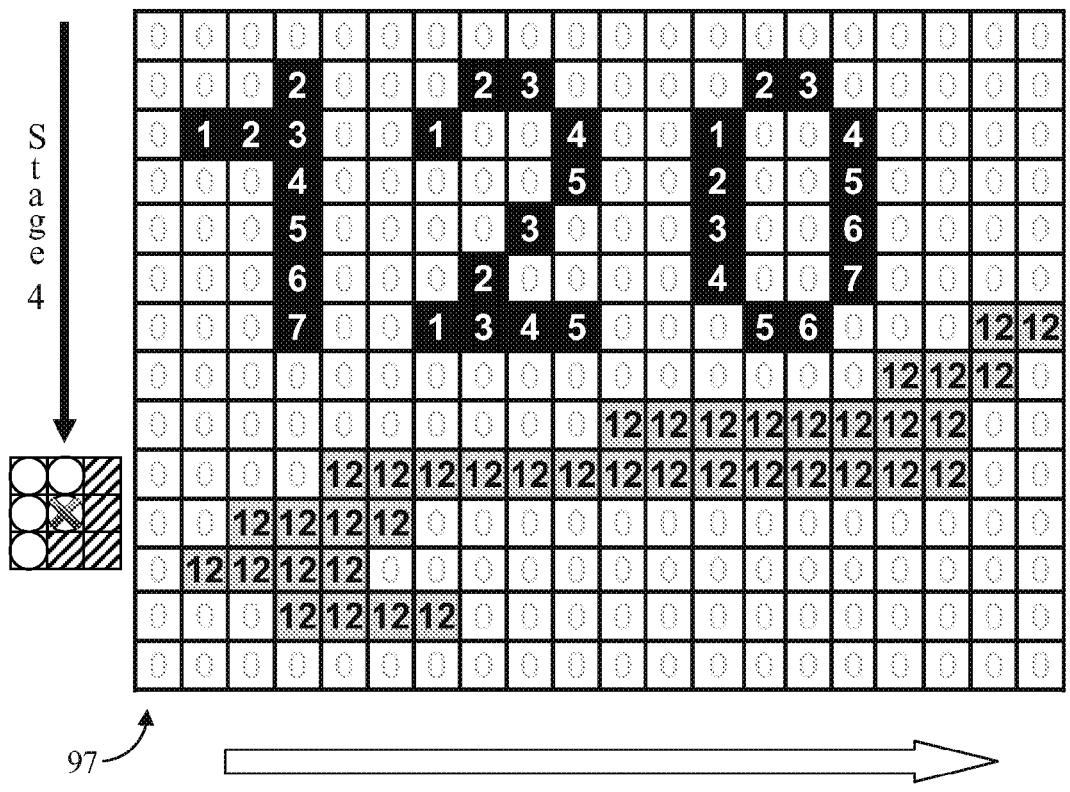
Figure 15:
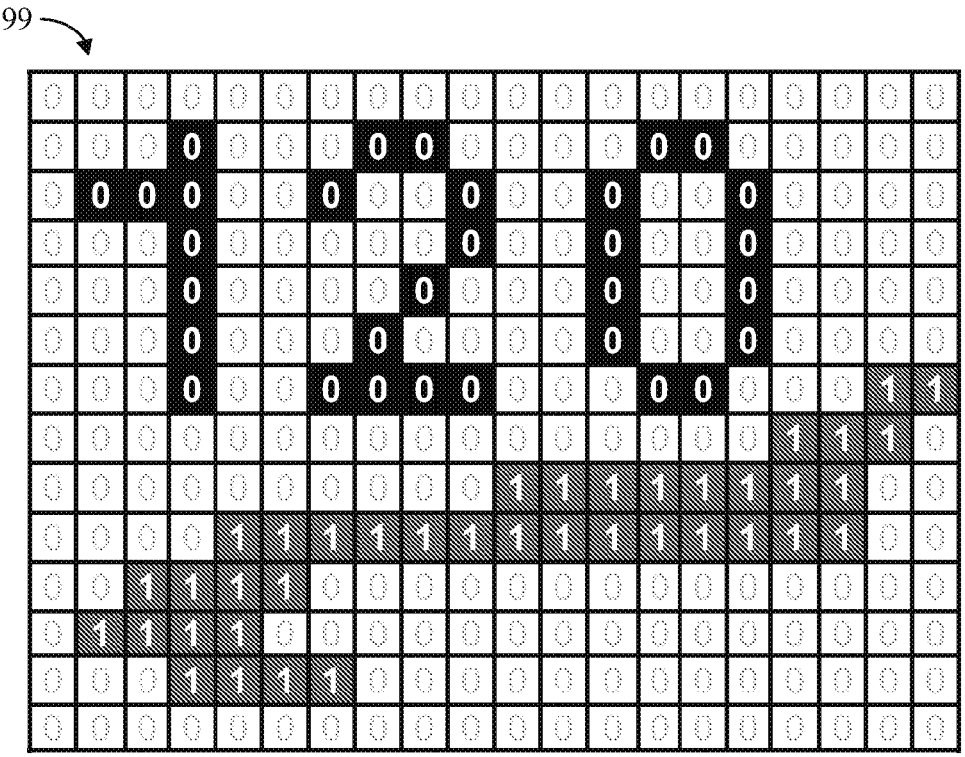

Proceeding to module 65, since the effort value has still not been reached, the unaltered working image 95 is submitted to module 59 for a fourth iteration (i.e. Stage 4). As before, module 59 retrieves the scanning direction and mask corresponding to Stage 4, as illustrated in FIGS. 4 and 14. Module 61 then determines connectedness measures for the pixels, as described above, resulting in working image 97.

Since Stage "4" now matches effort value "4", module 63 does not alter working image 97, and processing proceeds to module 65, which marks as "Clean" all pixels having a connectedness measure greater than "0" and lower than the connectedness threshold (i.e. lower than "12"), and marks as "Defect" all pixels having a connectedness measure not smaller than the connectedness threshold (or equivalently in the present example, having a connectedness measure equal to "12"). As illustrated in working image 99 of FIG. 15, foreground pixels marked as "Clean" are identified by a white boldface numeral 0 in a black square, and foreground pixels marked as "Defect" are identified by a white boldface numeral 1 in a gray square. All other pixels (i.e. background pixels) are identified by a black non-boldface black numeral 0 in a white square.

Figure 16:
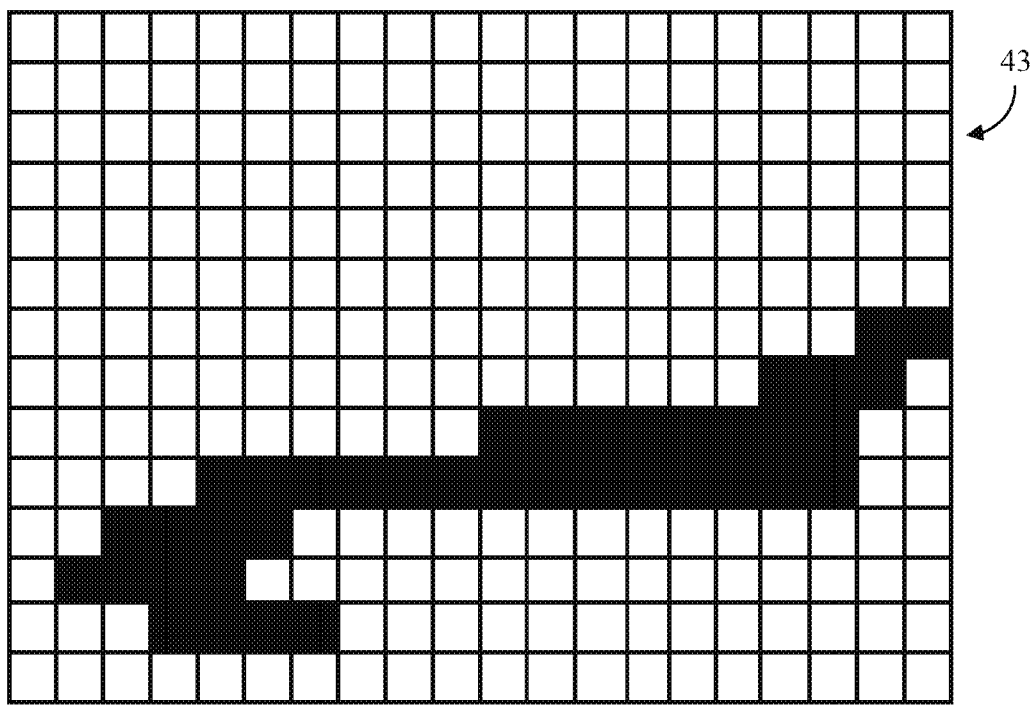
Figure 17:
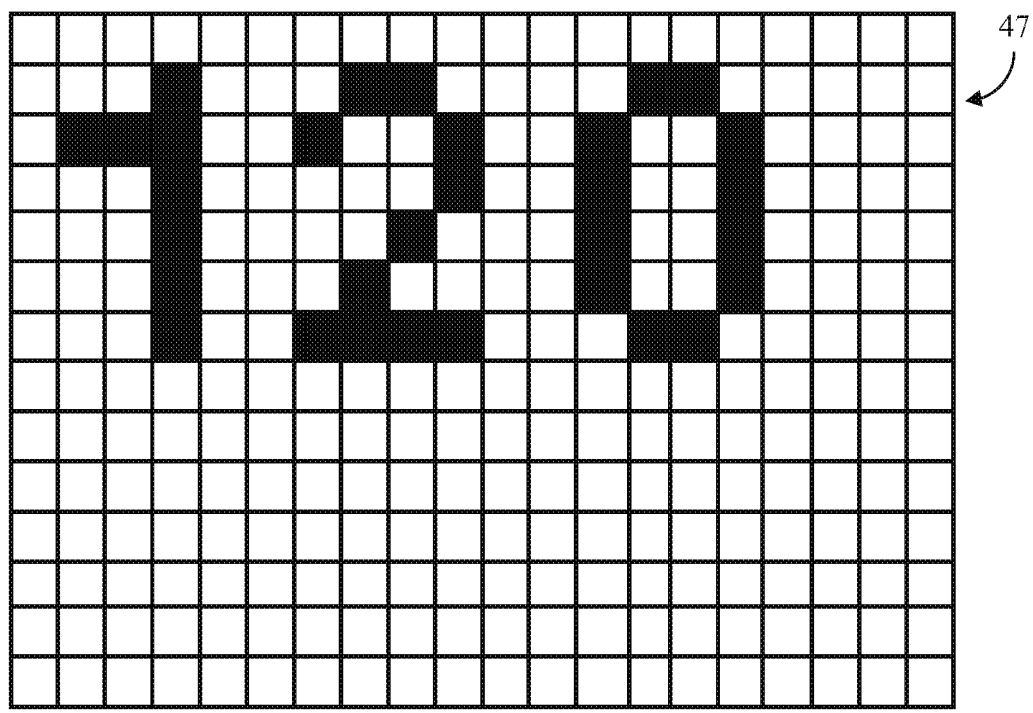

Module 67 then removes the "Defect" marked pixels from working image 99 to form Defect map 43 illustrated in FIG. 16. Similarly, module 67 removes the "Clean" marked pixels from working image 99 to form Clean image 47 illustrated in FIG. 17.

Figure 18:
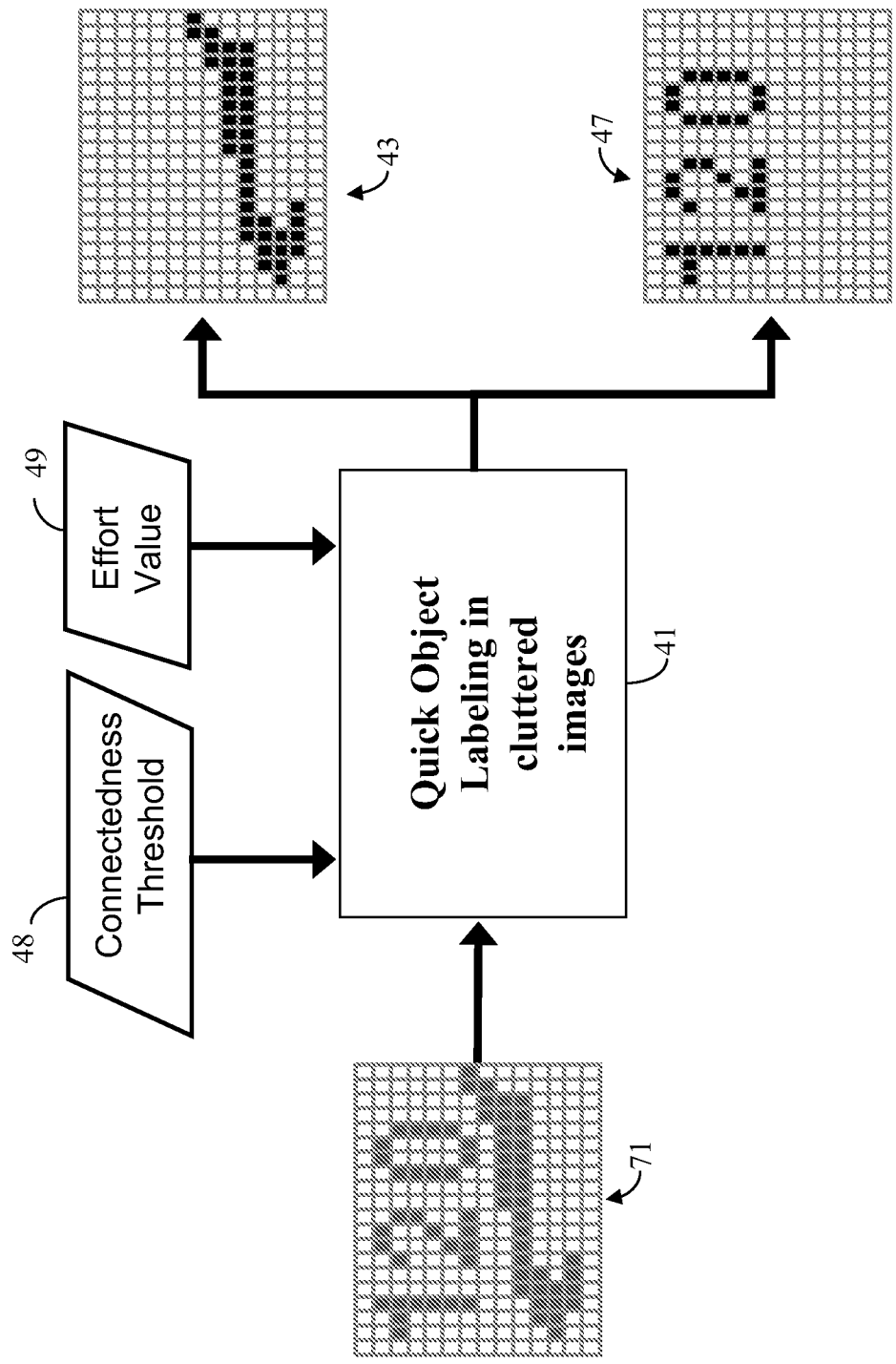

FIG. 18 illustrates the effects of FIGS. 6-17 on input image 71 to produce Defect map 43 and Clean image 47. All elements in FIG. 18 similar to those of FIGS. 3-17 have similar reference characters and are described above.

Figures 19A, 19B, 19C:
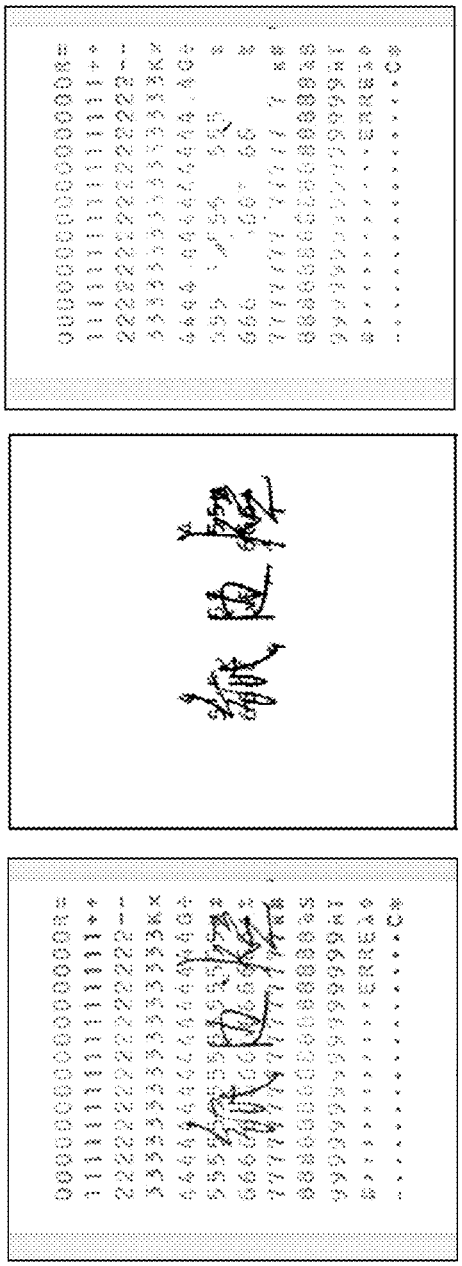
FIGS. 19A to 19C are a first set of real-world sample results of the present process.

Real-world sample results of the present process are illustrated with reference to FIGS. 19A to 25C. These are a set of results generated by using the above-described process. The elapsed times reported in this experiment are measures on an Intel Core2 Quad CPU 2.66 MHz PC. FIGS. 19B and 19C show the results of applying the present process on the image shown in FIG. 19A. Here, the input image 19A is scanned at 600 DPI (1529 pixels by 1731 pixels). In this experiment, the effort value was set to 4 and the connectedness threshold was set to 200. The process took 141 ms to produce the defect map shown in FIG. 19B and the clean image shown in FIG. 19C. There are 1053 objects in the input image of FIG. 19A.

Figure 20:
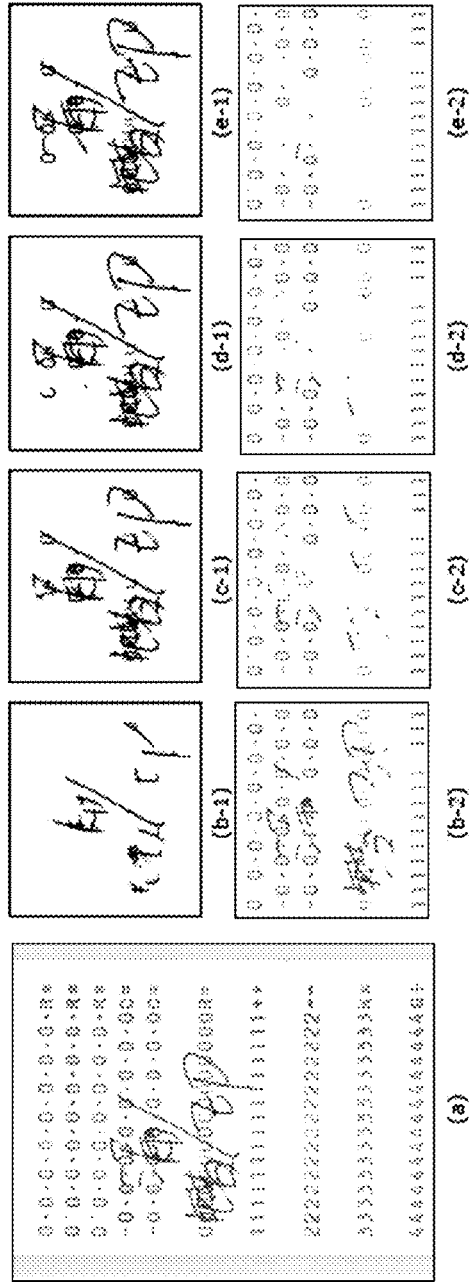
FIG. 20 illustrates real-world sample results of the present process with increasing effort value.

The affects of altering the effort values was also studied. FIG. 20 illustrates the results of progressively increasing the effort values from 1 to 4. In the present experiment, a portion of input image (a) is shown with handwritten scribble representing non-printed, non-glyph image artifacts. Input image (a), which has 608 objects, is scanned at 600 DPI (1529 pixels by 1966 pixels). In this implementation, the connectedness threshold is again set to 200. Setting the effort value set to "1", results in defect map (b-1) and clean image (b-2). It is noted that only the affected portion (i.e. the portion corresponding to the handwritten scribble on input image (a)) is shown. Increasing the effort value to "2" resulted in defect map c-1 and clean image c-2. Further increasing the effort value to "3" produced defect map d-1 and clean image d-2. A defect value of 4 resulted in defect map e-1 and clean image e-2. Increasing the effort value beyond 4 did not render noticeably much better results.

Figures 21, 22:
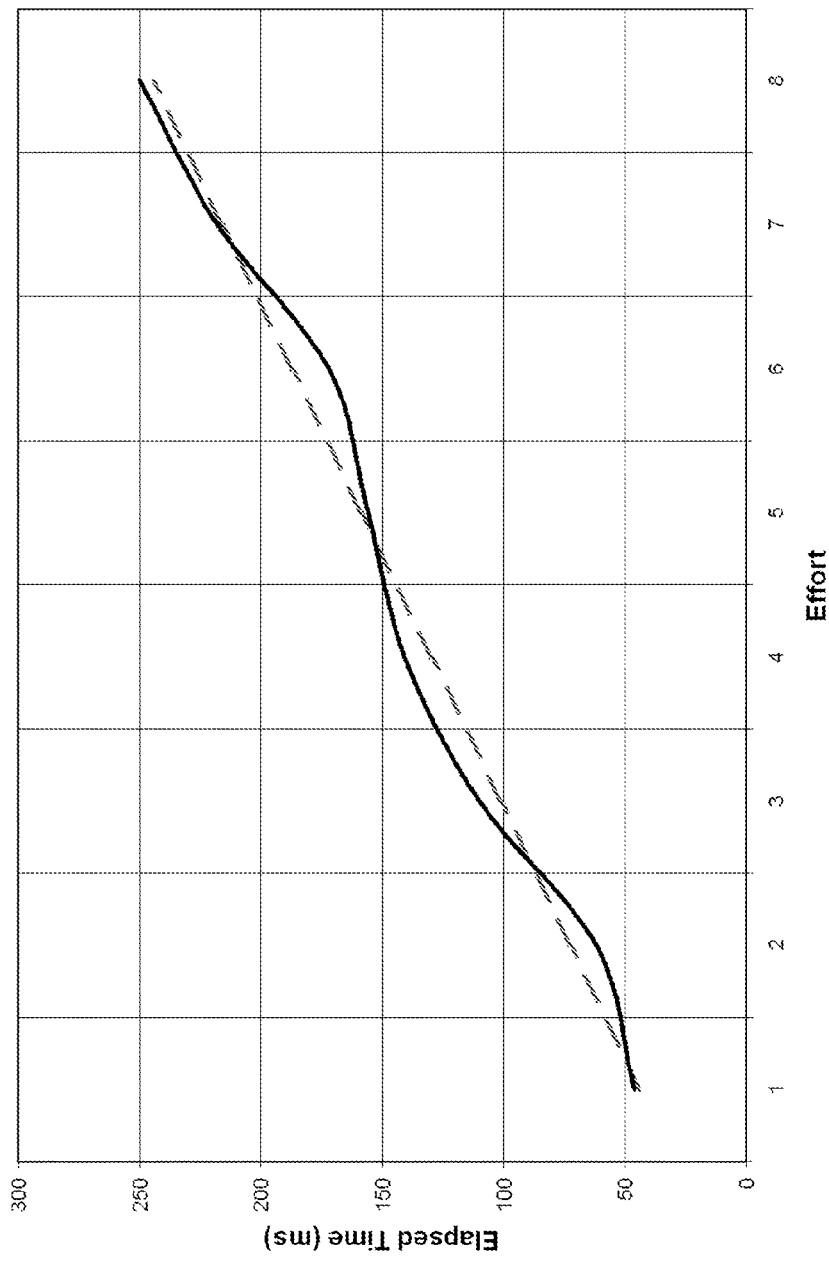
FIG. 21 is a table comparing the increase in processing time and detected area as the effort value is increased from 1 to 8.
FIG. 22 is graph of the elapsed time for the experimental results of FIG. 21.
Figure 23:
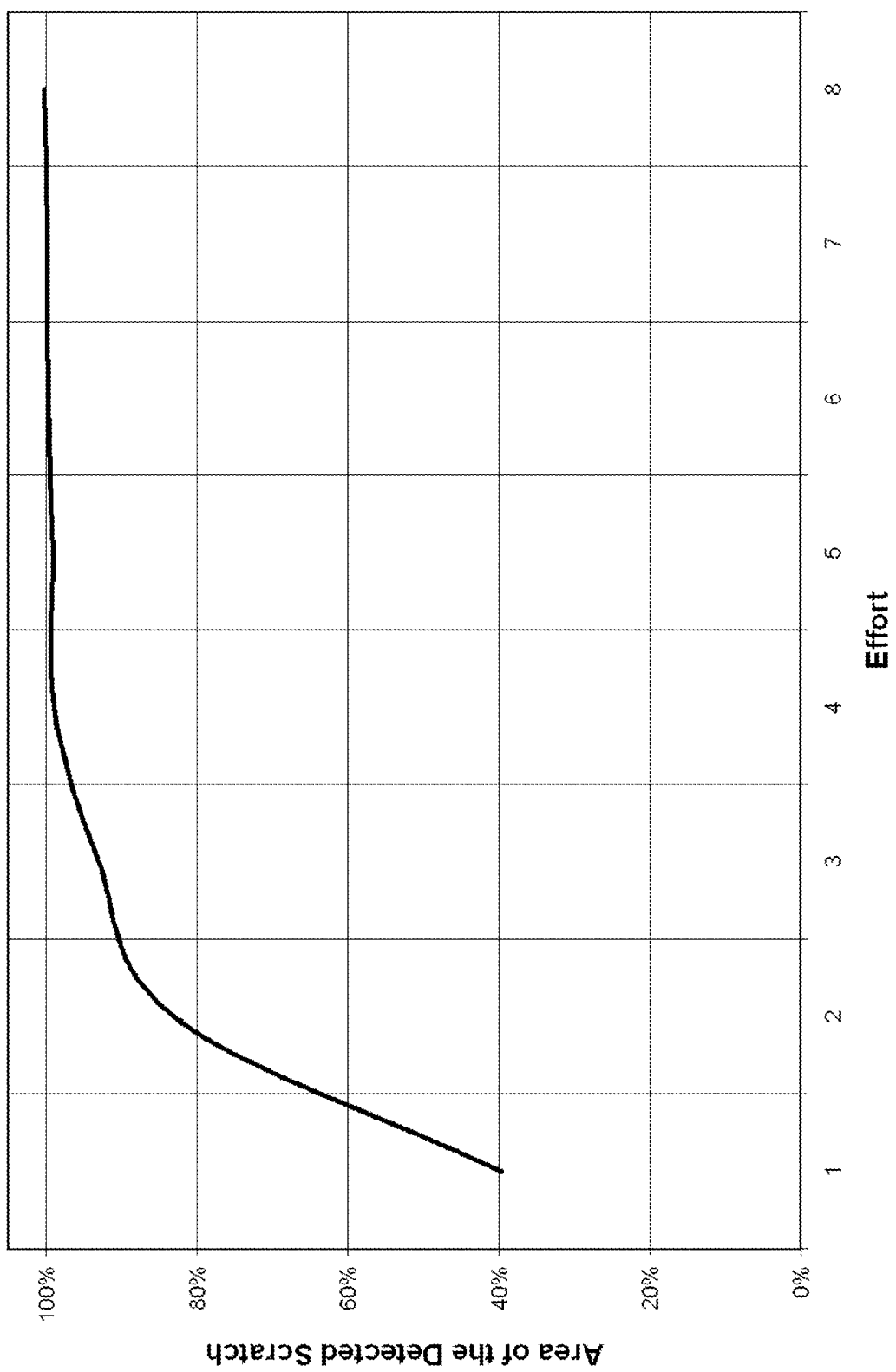
FIG. 23 shows a graph of how the detected scratch area changes with increasing effort value.

FIG. 21 is a table comparing the increase in processing time and detected area as the effort value is increased from 1 to 8. FIG. 22 is graph of the elapsed time for the experimental results of FIG. 21, and the corresponding numerical values are listed the Table of FIG. 21. FIG. 23 shows a graph of how the detected scratch area (i.e. the area corresponding to handwritten markings) changes with increasing effort value. Analysis shows that the present implementation takes approximately 15+29(effort value) milliseconds to finish the task for input image (a) of FIG. 20. As shown in FIG. 23, an effort value less than six typically suffices since there is no/little significant difference in the outcome of the process as the effort value is increased above four. This result is consistent with other experiments that indicate that an effort value of "4" suitable for most applications.

Two additional experimental results are shown in FIGS. 24A to 24C and in FIGS. 25A to 25C, respectively. FIGS. 24A are 25 show the input images to these two examples. FIGS. 24B and 25B show the correspondingly produced defect maps, and FIGS. 24C and 25C show the correspondingly produced clean images. In both of these two additional experiments, inputs image 24A and 25A are scanned at 300 DPI, the effort value is set to "4", and the connectedness threshold is set to "100".

This embodiment has been shown to processes images that contain thousands of objects. Unlike many implementations of the conventional blob-analysis approach that have to generate a linked-list of all the objects present in the image, the present implementation does not require such linked-lists. As it is known in the art, the maintenance of such linked-lists and the memory space needed for them place burdens on any algorithm using them, particularly when the number of objects is large. By contrast, the present process only needs enough memory space to hold the input image.

As it is also known in the art, the conventional approach to identifying objects in an image is based on a recursive search for connected components. Such conventional approaches need a larger memory stack and/or many function calls, which slow down their implementation. The presently preferred implementation, by contrast, uses a constant number of iterations (i.e. stages) over an input image. The speed advantage of the present process is evident in experimental results that showed it requires only about 50 milliseconds to process one mega pixels, on the PC machine described above.

Next, Quality Assessment and Defect Detection module 35, shown in FIG. 2, is discussed. As noted above, Quality Assessment and Defect Detection module 35 provides an automated visual inspection of printed DUTs in order to reduce the required number of human inspectors 17. Therefore, the effectiveness of the present system is directly dependent upon the effectiveness of Quality Assessment and Defect Detection module 35.

As it would be understood, one method of improving the effectiveness (i.e. the judgment quality) of Quality Assessment and Defect Detection module 35 is to train it with an extensive library of detailed training print samples. Each training print sample should include a detail description of its content and its defects in order for Quality Assessment and Defect Detection module 35 to learn to differentiate between defect types. However, the amassing of a great number of training print samples along with detailed cataloging of their known defects is a daunting task. Therefore, the presently preferred system further includes a system/process for simulating printed samples, whose content and defects are predefined, so as to provide an almost unlimited library of high quality, fully documented, training print samples with which to train Quality Assessment and Defect Detection module 35. Thus, before proceeding with a detailed discussion of a preferred method for training Quality Assessment and Defect Detection module 35, it is advantageous to first describe a preferred system/process for creating such simulated print samples. The following is description of a preferred print simulator (or printer simulator) used to generate a library of simulated training print samples.

As part of the present visual inspection project, the print simulator is further helpful in articulating and clarifying the scoring of printed characters, as described in more detail below. But the overall purpose of the visual inspection project is to automate the inspection of physical printouts from printers, and in particular from POS impact printers. To help tune the system's ability to mimic a real inspector's reports and scores, a character simulator is created so that realistic-looking samples with a spectrum of predefined print defects can be produced. In addition, the print/printer simulator may be used to generate receipts for testing the inspection module (i.e. the Quality Assessment and Defect Detection module 35, in the present embodiment) on a whole system, such as the system shown in FIG. 2.

The present print simulator models an impact printer having an ink ribbon. In different embodiments, the ink ribbon may have one or more colors. The print simulator defines a high resolution binary image of a printable character as a template for that character, and simulates different printouts of that character using the template. By defining a separate template (i.e. a separate high resolution binary image) for each printable character, and defining various, adjustable, printer-related characteristic, the print simulator can produce a multitude of simulated printouts for each printable character.

Figure 26:
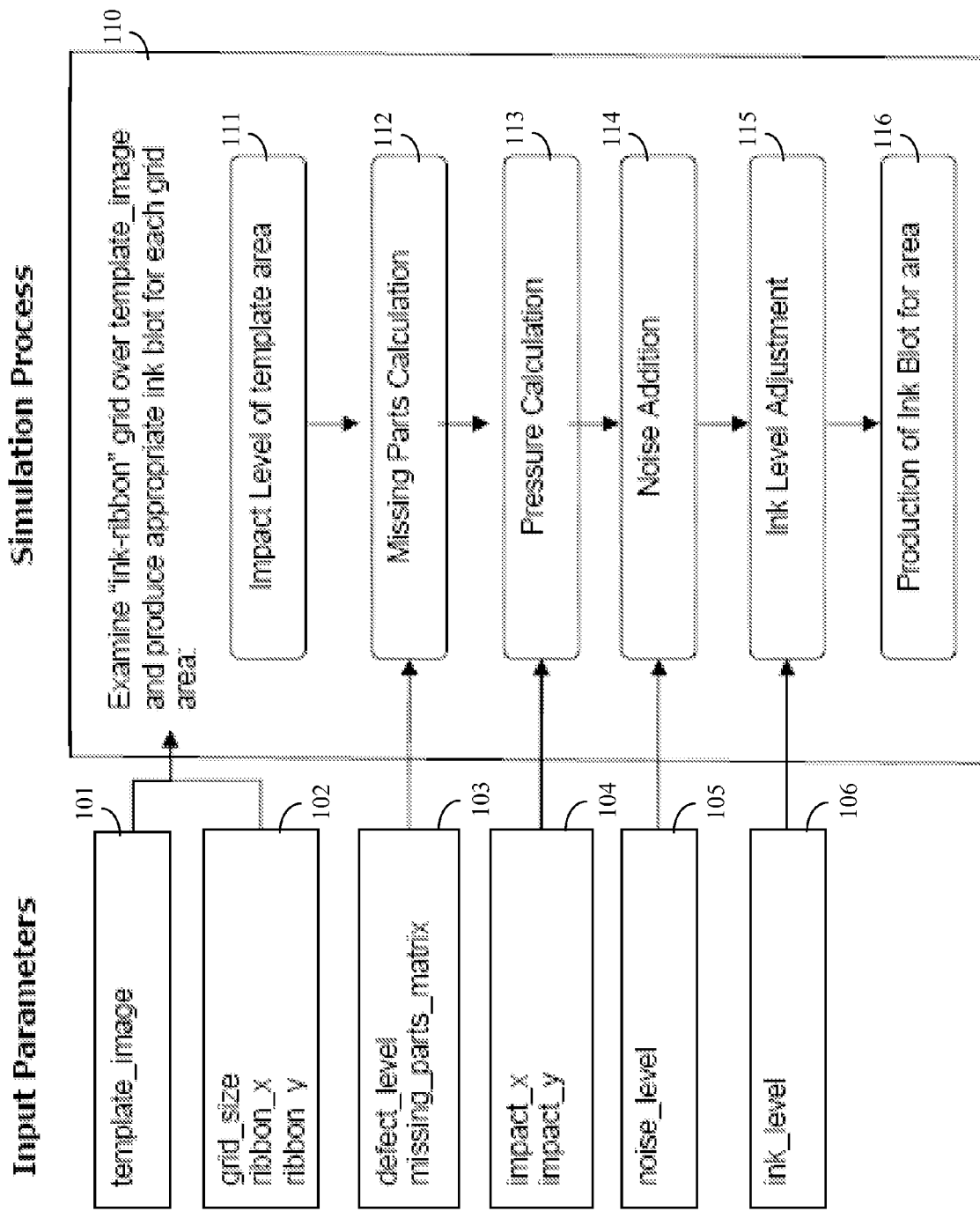
FIG. 26 is a diagram outlining some major components and steps of a preferred print simulator in accord with present invention.

FIG. 26 is a diagram outlining some major components and steps of a preferred print simulator. Simulation process (or processor or module) 110 makes use of template_image 101 and parameters 102-106, which may be accessed from a memory store, received from another processing module, inputted by a human user, and/or otherwise identified in a manner generally known in the art. For ease of explanation, the following discussion assumes that template_image 101 and parameters 101 are inputs (or input parameters) to simulation process 110.

Preferably, the inputs include: a template_image (or template) 101 of a printable character to be simulated (i.e. a high resolution binary image of the desired printable character); ribbon characteristics 102 such as grid_size, ribbon_x and ribbon_y; a desired defect_level and missing parts_matrix 103; impact location parameters 104 impact_x and impact_y indicating a relative offset for the simulated printed character; desired noise_level 105 such as corresponding to errant ink dots; and ink_level 106 of the simulated ink ribbon. Input parameters 101 to 106 are described in more detail below.

The template_image 101 preferably is used in conjunction with a grid that defines grid points where simulated ink blots may be deposited. That is, the grid may be divided into grid points of squares or circles, where each grid point defines a possible location for an ink blot within the grid. Preferably, each simulated ink blot is defined by the amount of ink and shape/size/fading characteristics of the ink blot to be deposited. The high resolution binary image may indicate which grid points corresponding to an ink blot based on the overlap (or superposition) of the high resolution binary image (i.e. template_image 101) with the grid.

Simulation process 110 receives the template_image 101, the grid_size and ribbon offset (i.e. ribbon characteristics 102) to determine an appropriate ink blot for each point within its corresponding grid. Input parameter grid_size indicates the grid-point dimension of the grid (i.e. indicates how many squares/circles are comprised within the grid). The grid, itself defines the area of an ink ribbon to be struck. How many pixels fit within each grid point is determined by adjusting the pixel size of the grid to match the pixel size (i.e. the pixel dimension) of template_image 101, as closely as possible, while keeping the number of grid points fixed and the pixel dimension of each grid point uniform.

Simulation process 110 determines an appropriate "impact level" for each grid point (or to its corresponding template area), based on input parameters ribbon_x and ribbon_y, as indicated by processing block 111. That is, input parameters ribbon_x and ribbon_y define a mismatch (or offset) between template_image 101 and the resized grid, and processing block 111 determines which grid point coincide with a character glyphs within template_image 101. Basically, processing block 111 determines which grid points should receive an ink blot (under ideal, i.e. no defect, conditions) based on the print character defined by template_image 101. If a grid point coincides with an area of template_image 101 that contains some portion of a printable character, then it should be designated to receive an impact force, but if a grid point coincides to an area of template_image 101 that is blank (i.e., contains no portion of a printable character), then it should be designated to receive no impact force.

The impact level of each grid point is combined with the desired defect level for that grid point, along with the inputted missing parts matrix (103) to determine a missing parts calculation (processing block 112). This is further combined with the desired print location of the simulated character, as specified by impact location parameters 104, to determine a pressure calculation (processing block 113). The desired noise_level 105 is then added by noise addition processing block 114. Processing block 115 then adjusts the ink level as specified by parameter ink_level 106, and processing block 116 produces the resultant "ink blot" to be imaged/printed on each grid point (i.e. for the output image area).

Figure 27:
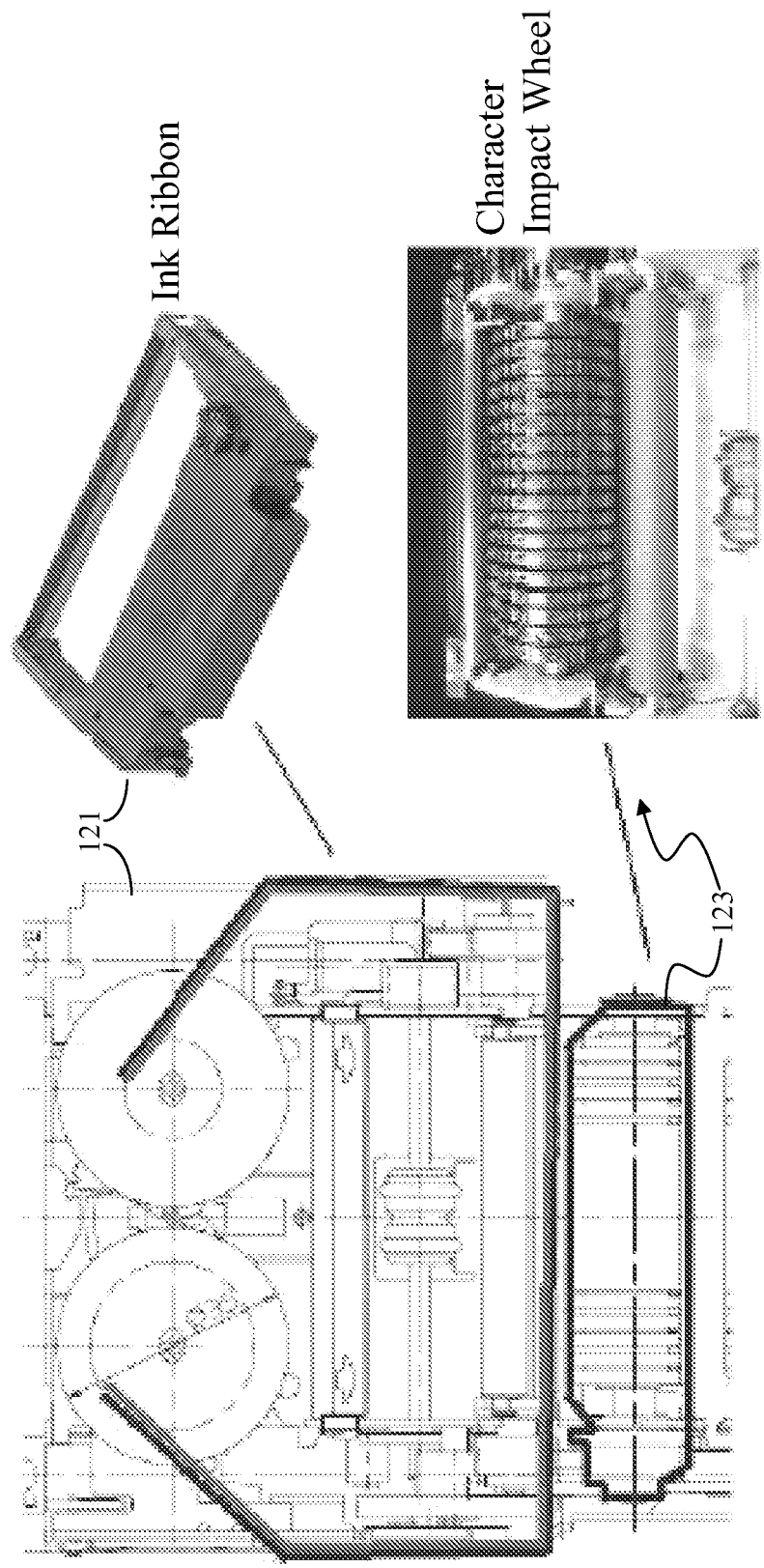
FIG. 27 shows a schematic diagram and photo of a typical ink ribbon and a typical character impact wheel used in a typical POS impact printer.

The implementation of pressure calculation processing block 113 depends upon the type of impact printer being simulated. As an example, FIG. 27 shows a schematic diagram and photo of a typical ink ribbon 121 and a schematic diagram and photo of a typical character impact wheel 123 used in a typical POS impact printer. As it is known in the art, specific templates may be selected for printing by rotating the physical templates (i.e. character molds/signs) of impact wheel 123 to configure a desired line of text, and having the thus selected templates impact ink ribbon 121. In one embodiment, the entirety of impact wheel 123 may be forcefully moved (such as by means of an impact hammer or other mechanism) to impact ink ribbon 121 with the configured line of text. Alternatively, one or more impact hammers may individually strike (singularly or concurrently) only selected templates, causing them to impact ink ribbon 121, which in turn impacts a sheet of paper (or other print medium) and deposits ink upon it.

Basically, ink ribbon 121 is an ink-covered strip that lies between impact wheel 123 and the paper to be printed upon. The impact hammer(s) causes select templates of impact wheel 123 to strike ink ribbon 121, which then comes in contact with the paper and deposit ink in the shape of the characters defined by the templates.

Figure 28:
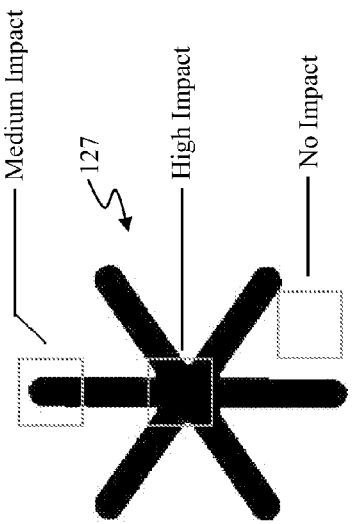
FIG. 28 shows a high resolution scan of a typical printout sample produced by an impact printer having a printing mechanism similar to that shown in FIG. 27.

FIG. 28 shows a high resolution scan 125 of a typical print sample (a capital letter G) produced by an impact printer having a printing mechanism similar to that shown in FIG. 27. Inspection of high resolution scan 125 shows that the ink ribbon behaves like a diamond-like grid of points. For ease of discussion, the diamond-like grid may be termed a ribbon grid block, and each point within the diamond-like grid may be termed a ribbon grid point. Inspection further shows higher intensities of ink on ribbon grid points located at the center of the ribbon grid block, as compared to the ribbon grid points closer to the outskirts of the ribbon grid block.

Simulation of such an impact printer should therefore consider each ribbon grid points individually as it is applied to "paper" (i.e. the simulated output image) when ribbon grid points intersect (i.e. coincide with, or overlap) a template's border (i.e. the template image's area) to an acceptable degree. That is, the level of impact each ribbon grid point is simulated to make with the "paper" is modeled by calculating how many ribbon grid points of the ribbon grid block lie within the area of the template image, which may be determined from input ribbon characteristics parameters 102 and/or impact location parameters 104, for example. This level of impact is used in determining the amount of ink simulated to be applied to a corresponding area on the "paper". An example of this type of impact variance is illustrated in FIG. 29.

Figure 29:
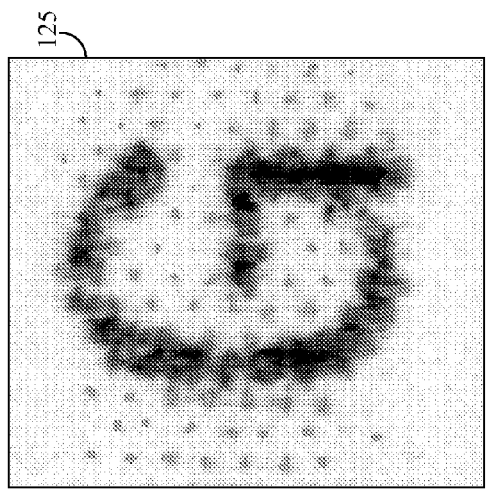
FIG. 29 illustrates a template of an asterisk character.

FIG. 29 illustrates a template of an asterisk character. For ease of discussion, the combination of an impact hammer and a template that impacts an ink ribbon is herein termed a character hammer. Thus, the printing area 127 defined by FIG. 29 would coincide to a character hammer having an impact surface in the shape of an asterisk character.

Each character hammer can exhibit variance of contact with the ink ribbon across its impact surface. The area of highest contact with the ink ribbon is herein termed the impact center. In the print simulation, this impact center would then correspond to the highest intensities of ink that are deposited onto the "paper". Ribbon grid points farther from the impact center would be simulated to have less ink applied.

To model this contact variation, a 2D pressure map is created to model how the force of impact is distributed across the ribbon grid block. The preferred pressure variation model uses a 2D Gaussian distribution for the pressure map. For each simulated printed character, the appropriate character hammer is defined by its template (i.e. input parameter template_image 101 of FIG. 26), and in one embodiment, the impact center (or a corner of the template_image 101) may be shifted in the x and y axis as defined by impact location parameters 104. The standard deviation of this Gaussian distribution can also be adjusted to modify how quickly the pressure drops off from the impact center. For example, areas of high impact, medium impact and no impact are labeled for printing area 127 of FIG. 29.

Figure 30:
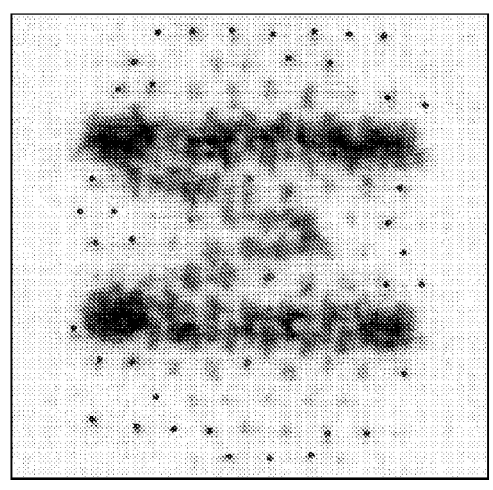
FIG. 30 illustrates noise in high resolution scans in the form of an array of dots that surrounds most characters produced.
Figure 34B:
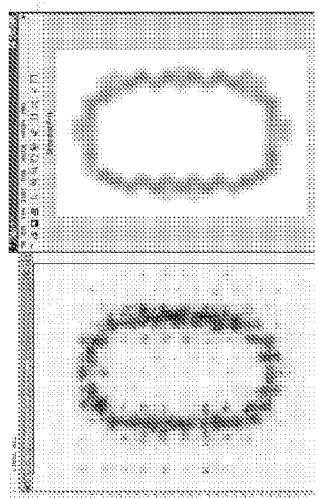
FIGS. 34A to 34E show 5 pairs of initial simulated character prints.
Figure 34E:
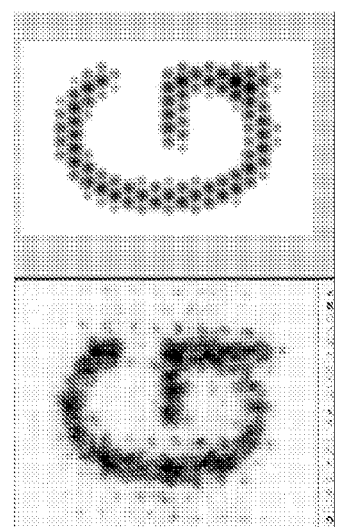
Figure 34A:
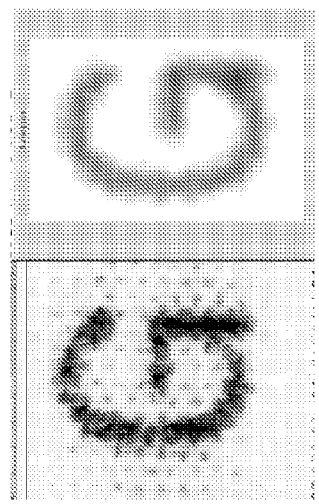
Figure 34D:
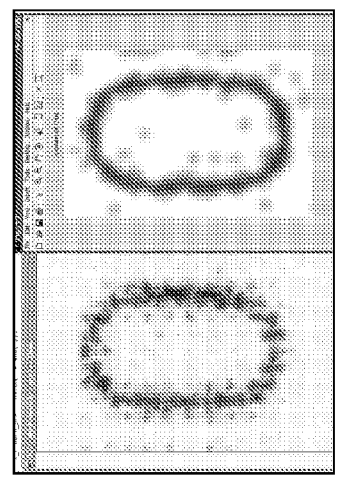

Another area of simulation is noise. The most apparent source of noise found in analysis of both real, physical receipts and their corresponding high resolution scans was an array of dots that surrounded most characters produced, as illustrated in FIG. 30. This noise is assumed to be ink debris scattered on the paper when the ink ribbon is struck by a character hammer. That is, the character hammer striking the ink ribbon causes the surrounding areas of the ink ribbon to be brought sufficiently close to the paper to imprint small dots. This noise is preferably simulated by employing a 2D Gaussian filter that is extended (i.e. elongated) along the horizontal axis.

Figure 31:
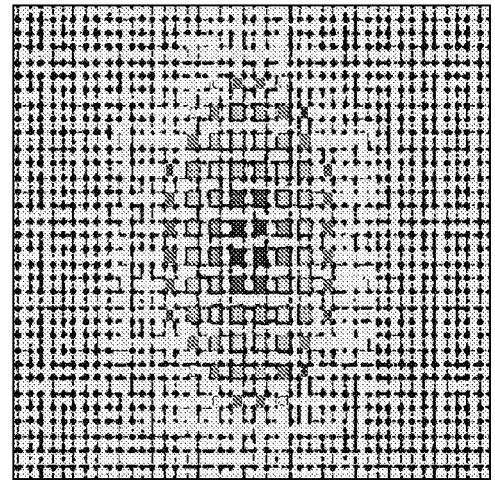
FIG. 31 illustrated a preferred model noise filter.

FIG. 31 illustrated a preferred model noise filter. Further preferably, the noise filter does not consider (i.e. it omits from filter processing) alternate ribbon grid points (i.e. every other ribbon grid point in the X and Y directions). The amount/intensity of noise to be simulated may be defined by input noise_level parameter 105.

Figure 32:
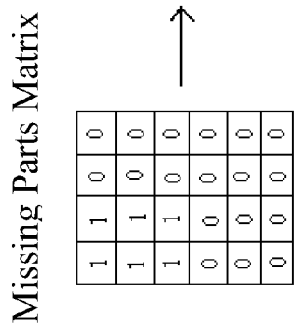
FIG. 32 is an example of a missing_parts_matrix used in the simulation of a numeral "6" character having varying defect levels.
Figure 34C:
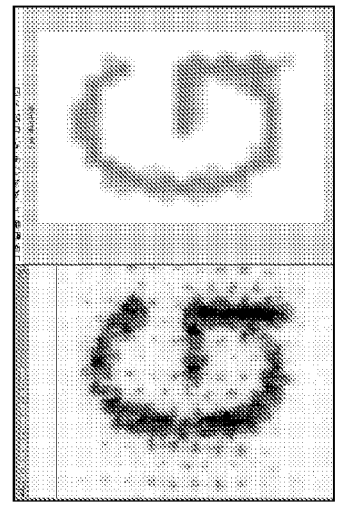

A common defect associated with the inspection process is that of missing or faded parts of a printed character. This defect is preferably modeled by creating a 6×4 matrix representing portions of the character that will be missing to a specified degree. The missing parts and the degree to which those parts are missing (i.e. the fade or defect level) may be specified by inputs defect_level and missing_parts matrix (i.e. input parameters 103 of FIG. 26). An example of a missing_parts matrix used in the simulation of a numeral "6" character having varying defect levels is illustrated in FIG. 32. In the missing_parts_matrix, a "1" in a matrix cell indicates a region where fading will be applied and a "0" indicates a region where no fading is applied. The defect level applied to matrix cell having a "1" is not specified in FIG. 32.

Several different print simulation techniques may be implemented. For example, one may take an ink diffusion approach toward simulation of a printed character. Methods using this approach typically employ a simplified computational fluid dynamics model to simulate the diffusion of ink particles on paper. Of particular interest would be the Lattice Boltzmann method, which outlines an iterative cell-based method for approximating fluid particle distribution and velocities. This approach, however, is quite complex and places high demand on computing resources.

Another simulation technique may be to make use of an impact distance noise model. For example, analysis of high resolution print samples appeared to indicate that noise dots are more likely to appear at areas closer to the initial point of impact with the paper. That is to say, areas closer to where the character hammer and ink ribbon hit the paper would correspond to a higher level of noise. This technique, however, raises a high level of complexity.

A third possible technique for simulating the printed character is to model ink blots generated using high-resolution textures. Selecting texture samples taken from real high resolution print samples, to generate a simulation result might produce a more realistic appearance. Implementation of this approach would likely benefit from using a fine set of textures (i.e. a collection of small texture areas).

The preferred embodiment, however, makes direct use of the above-described input parameters of FIG. 26. Input parameter template_image 101 preferably defines a high resolution grayscale image (preferably 1154×1734) consisting of only white pixel values (i.e., a pixel value of 255 on an 8-bit grayscale) and black pixel values (i.e., a pixel value of 0 on the same 8-bit grayscale) making up the body of each text character.

A ribbon grid block (or simply grid, hereinafter) over the template image is analyzed during the simulation process. Each ribbon grid point (or simply grid point, hereinafter) is considered for ink deposits (i.e. ink blots), and the grid represents the diamond-like texture of the ink ribbon. The grid consists of a plurality of grid points, and the size of these grid points is calculated relative to the template size. That is, a uniform size is selected for all of the grid points (for example, in terms of pixels per grid point) such that the size of the overall grid matches (as close as possible) the size of the template image. For example, grid point areas of 72×72 pixels were used for the 1154×1743 templates. The grid size/ribbon_x & ribbon_y input parameters 102 are used in conjunction with this grid. The ribbon_x parameter specifies the initial horizontal offset the grid has relative to the top left position of the template image. Similarly, ribbon_y specifies the initial vertical offset the grid has relative to the top left position of the template image. If preferred, these offsets may be set to 0 by default; however they may also be randomized within a specified range to render the effect of ink ribbon translation and produce samples that exhibit a more realistic position variance.

Impact location parameters 104 are used in conjunction with a pressure map, as described above. Preferably, the pressure map is a 2D Gaussian filter that is the same size as the template image. It is used to simulate the variance in pressure applied by the character hammer over the area of the paper. The input parameters (i.e. variables) impact_y and impact_x are preferably in the range of [−1,1] and correspond to the impact center, where −1 and 1 correspond to the absolute leftmost and rightmost possible position for impact_x and −1 and 1 correspond to the topmost and bottommost positions for impact_y. A character produced with an input center shifted to the left will, for example, produce a character that has darker ink intensity toward the left of the character and lighter ink intensity toward its right. Examples of character produced with impact variation are discussed below.

The noise map as discussed in reference to FIGS. 30 and 31 is preferably a 2D Gaussian that has been elongated horizontally. This filter is created by convolving two 1-D Gaussian distributions, a first horizontal component and a second vertical component. Preferably, with the vector representing the horizontal component has a larger standard deviation than that of the vertical component. The filter is then normalized so that the highest intensity corresponds to 1 and the lowest to 0. To space out the noise dots, every other row's and column's values in the filter are cleared to represent no noise being considered on those grid points.

The missing parts matrix (from input parameter 103) is preferably a 4×6 (4 columns, 6 rows) binary array in which each matrix cell maps to a corresponding rectangular area of the template image. A numeral 1 in these cells indicates that this rectangular area should be considered to have some amount of fading (i.e., some level of missing parts), while a 0 indicates that the rectangular area should be treated as normal.

The defect level (also from input parameter 103) is preferably a real value ranging from 0 to 1, which denotes the amount fading in (i.e. denotes the amount of ink that should be removed from) the rectangular areas specified in the missing parts matrix. A defect level of 0 may correspond to no ink being removed from the missing part areas (i.e. no fading) while a defect level of 1 may correspond to the specified areas being completely removed in the simulated printed character. Any defect value in between 0 and 1 would correspond to a fractional amount of fading (or ink removal).

The above process, as applied to the simulation of one printable character, is summarized in the pseudo code and comments presented in FIG. 33.

FIGS. 34A to 34E show 5 pairs of initial simulated character prints. Within each pair, the image on the left emulates a character print at a high resolution, and the image on the right shows the resultant samples when downscaled and printed at more realistic sizes. These initial results produced inferior looking samples when downscaled and printed at realistic sizes.

However, refining the inputs produced very realistic results, and established effective ranges for each input. Sample images of refined results with various parameter settings are illustrated in FIG. 35. The refined results were produced after the ink level, pressure, and noise parameters were better clarified.

A script was written to facilitate the creation of samples, and to generate a spectrum of simulations of each character with respect to various parameters. FIG. 36 shows several real, high-resolution scans of simulated printouts.

Figure 37:
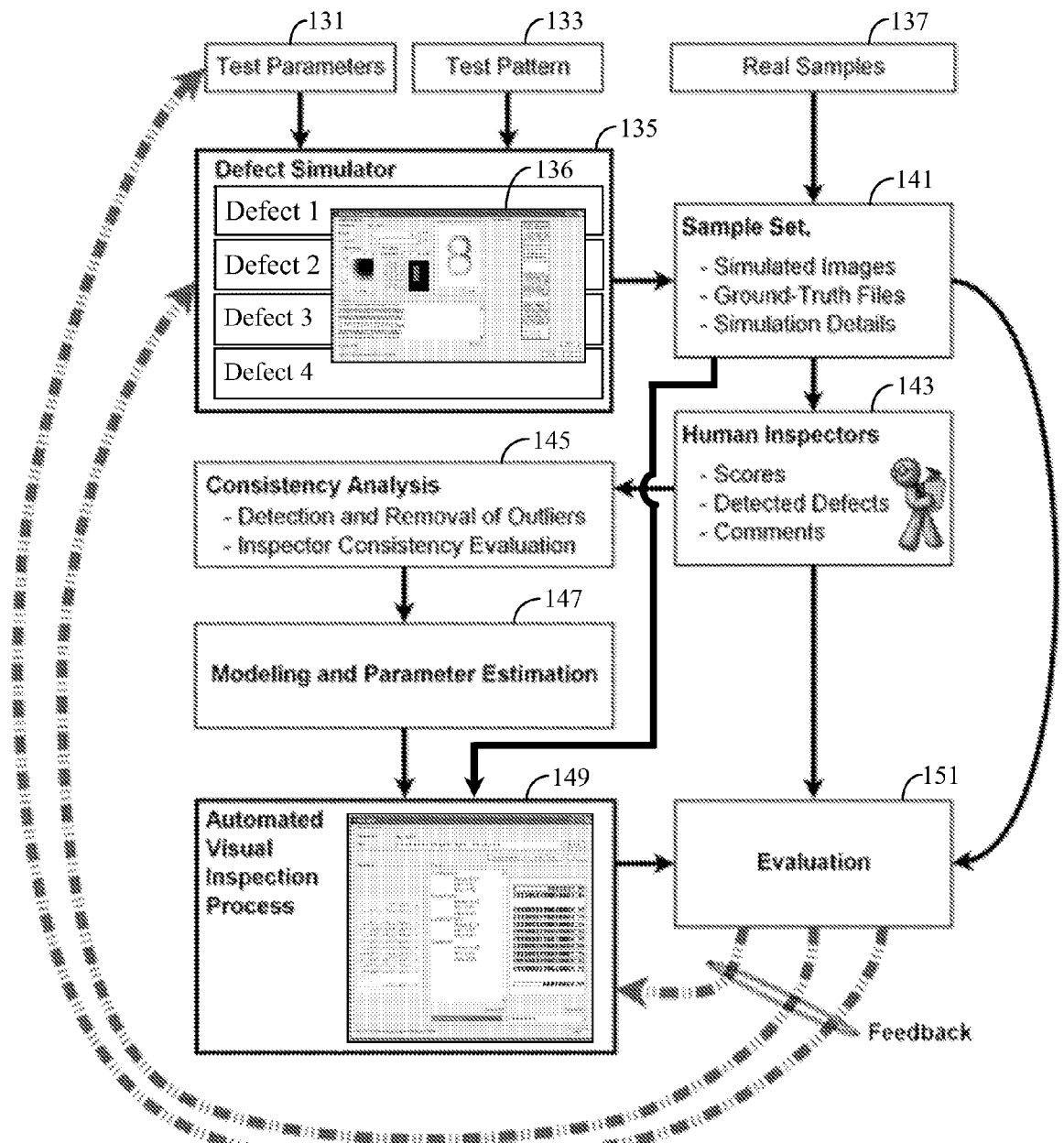
FIG. 37 provides an overview of a preferred training process.

Preferably, the user-adjustable input parameters shown in FIG. 26 may be adjusted via a graphic user interface, or GUI, as it is generally known in the art. Having thus discussed a method/system of cleaning up scanned images of real print samples, and also discussed a method/system for generating simulated printout, we now turn our attention to a method of training the Quality Assessment and Defect Detection module 35. FIG. 37 provides an overview of a preferred training process.

With reference to FIG. 37, defect simulator 135 may implement simulation process 110 of FIG. 26. Test parameter inputs 131 may include input parameters 101 to 106, shown in FIG. 26. Defect simulator 135 also receives as input a test pattern 133 of the printable characters (or character strings) for which simulated printouts are to be generated. As explained above, input test parameters 131 define the type of defects to be simulated, as well as the number of samples to be generated and the probability and severity of the defects. These are the defects that the present process will be trained to detect, and thus input test parameters 131 also define that defects that are to be examined (i.e. evaluated during an inspection of a printout). Preferably, input test pattern 133 is an appropriate buffer of data, and in the case of POS printers, it is a text file to be used by the Defect Simulator 135 in order to generate simulated defective samples (i.e. simulated defective printouts).

Figure 38A:
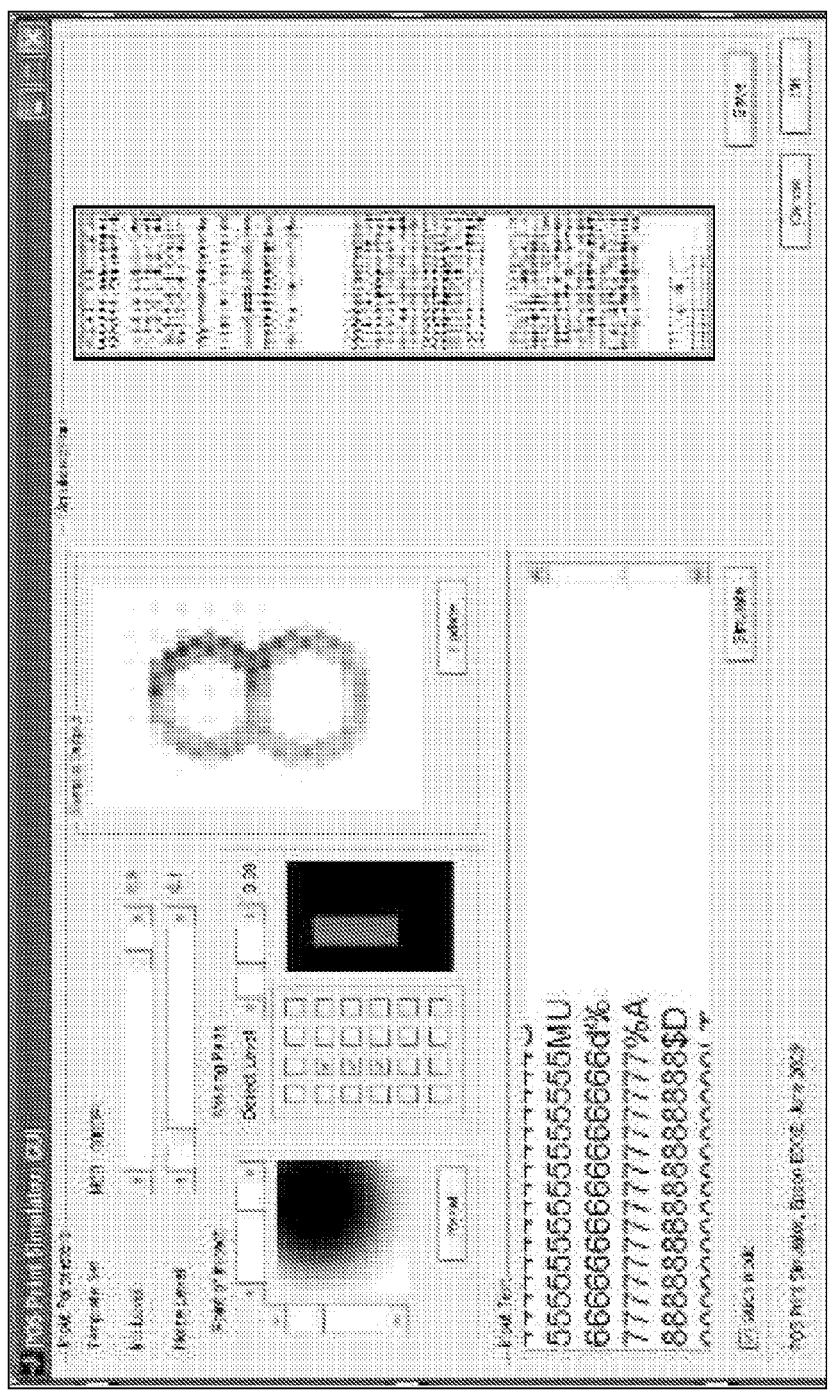
FIG. 38A is a sample image of a GUI used by Defect Simulator 135 of FIG. 37.
Figure 38B:
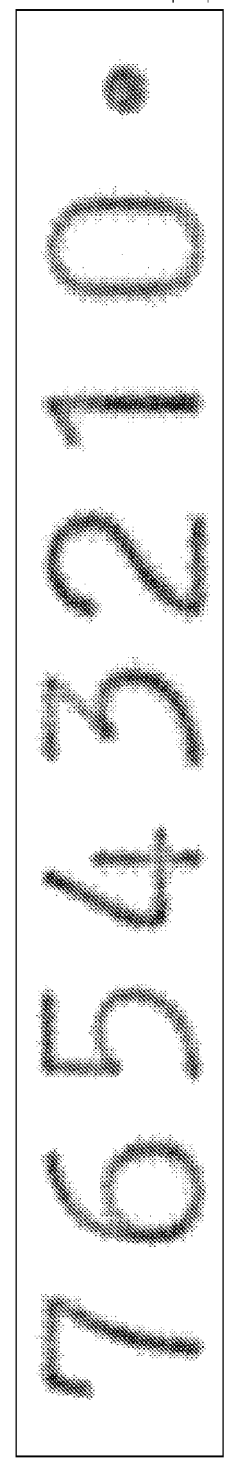
FIG. 38B illustrates a magnified view of an area in a printout sample image generated by the Print Simulator 135.

In the case of POS print inspection, the Defect Simulator 135 is a print simulator as described above. Input test parameters 131 may be an input file containing the defect input parameters (or may be inputted from a previous process module, not shown). If desired, however, Defect Simulator 135 may accept inputs directly from a human user. If direct input from a human user are accepted, then Defect Simulator 135 may incorporated a graphical user interface, GUI, such as illustrated by sample GUI image 136, to provide an easy human interface for defining the print errors that are to be simulated. The format of GUI image 136 is not critical to the present invention, but for the sake of completeness, a sample image of a GUI 136 used by Defect Simulator 135 is shown in FIG. 38A. This tool allows the user to select a number of parameters of the model, such as defect parameters ink density, noise level, point of impact, etc. as described above in reference to FIG. 26, and then to generate one or more simulated printout samples exhibiting the selected defects in different formats. FIG. 38B illustrates a magnified view of an area in a printout sample image generated by the Print Simulator 135.

The dataset generated by the Defect Simulator 135 consists of the sample images containing the selected defects as well as ground-truth files and a database carrying simulation details. The ground-truth files describe the contents of the sample images. For example, in case of POS print inspection, the ground-truth files carry the text contained in each simulated printout image as well as details about the defects introduced to each receipt by Print Simulator 135.

Preferably, the training process also makes use of a number of real printout samples, which may be prepared by means of Pre-Processing module 19 and Content Extraction and Analysis module 27, described above in reference to FIG. 2. These real samples 137 act as control data to be used in the examination of the sanity (i.e. efficacy) of the Defect Simulator 135.

Thus, the sample set 141 used for training is a collection of simulated images and real images. As is explained above, sample set 141 further includes ground-truth files, a list of errors defined or identified within each training image, and any simulation details.

Within the training process, sample set 141 may be presented to Automated Visual Inspection Process module 149 and to a number of human inspectors 143. The evaluations of human inspectors 143 are used to adjust various parameters of the automated evaluations system, including parameters of Automated Visual Inspection Process module 149. Preferably, the ordering of the samples is altered and unassuming names are selected for the samples so that the human inspectors 143 make their decisions independent of the process which has generated the samples. That is, human inspectors 143 are preferably not told which samples are real samples 137 and which samples are generated by Defect Simulator 135. The human inspectors 143 are then asked to provide score values for the samples as well as to tag each sample as defective or non-defective. The human inspectors are also encouraged to provide comments on the samples, should they find a point specific to a sample. The inspectors are also asked to highlight defective areas in the samples.

Figures 39A, 39B, 39C:
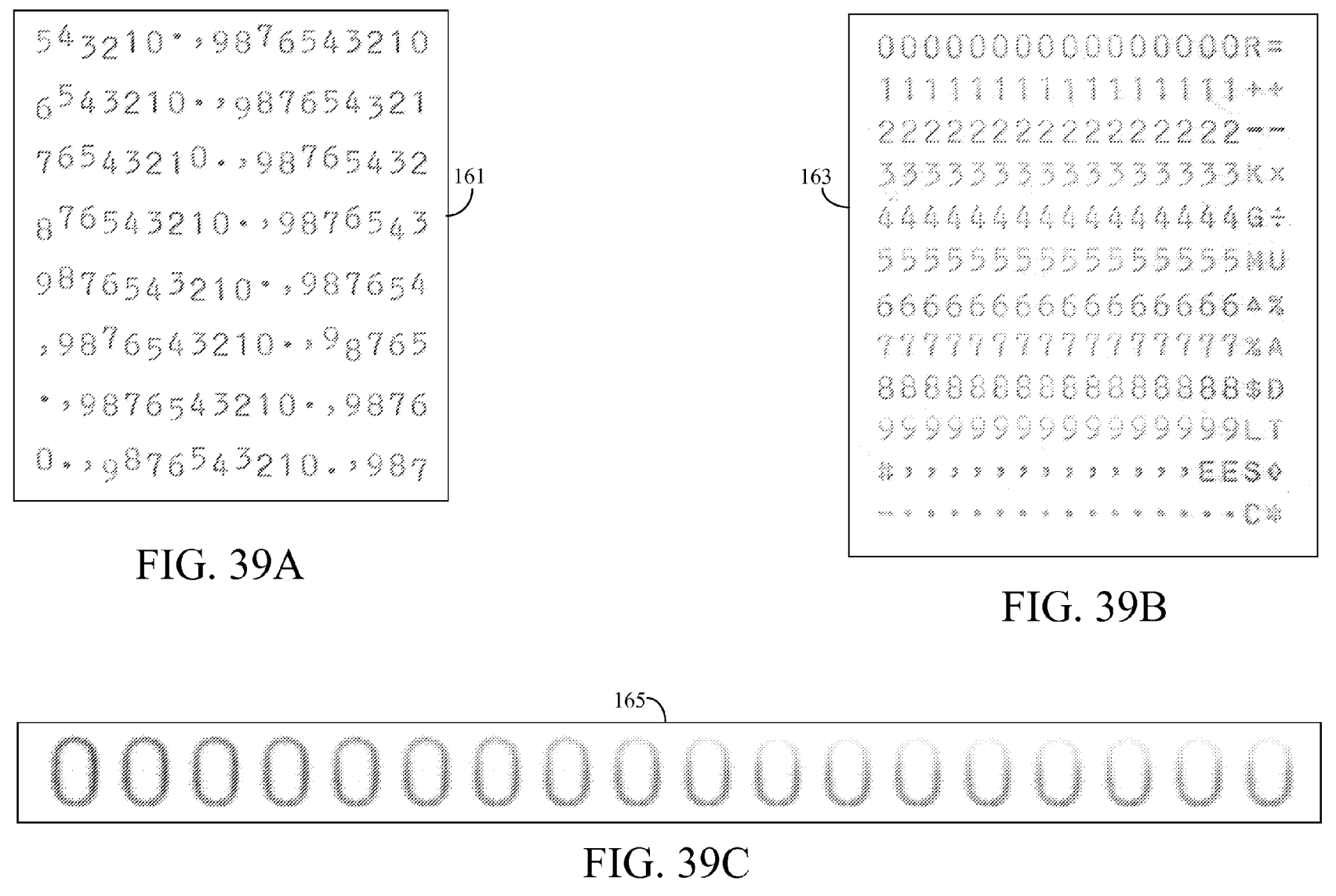

FIGS. 39A to 39C are examples of sample receipts/images presented to human inspectors 143 in the process of optimizing (i.e. training) the automated POS print inspection system. FIG. 39A is a simulated printout depicting a large portion of (or a whole) a receipt 161. Simulated receipt 161 contains simulated character displacement (25% of characters, with a 0.75 mm range of displacement). FIG. 39B depicts a scan receipt 163 of a real printed receipt. FIG. 39C depicts a simulated spectrum receipt 165 exhibiting a fading character defect with increasing severity (shown at 235% magnified). Simulated spectrum receipt 165 exhibits a gradual increase in the severity of character fading. The human inspectors 143 are asked to provide a score for every character in such a spectrum receipt. Through this process the internal threshold of each corresponding human inspector for a given defect can be estimated.

Human inspectors 143 are provided with sheets to enter the scores and comments. The samples may be given to the each human inspector 143 as a booklet. Each human inspector 143 returns the booklet in which the defective areas, according to the opinion of the human inspector, are highlighted.

The feedback received from the human inspectors 143 is filtered in a number of stages, illustrated as consistency analysis module 145. First, for each inspected sample, the average and the standard deviation of all the corresponding scores provided by all the human inspectors 143 are calculated. Then, the Coefficient of Variation (CV) for each inspected sample is calculated.

The CV provides a measure of consistency between different human inspectors. As such, samples for which different human inspectors have provided very different scores will produce a high CV value.

Figure 40:
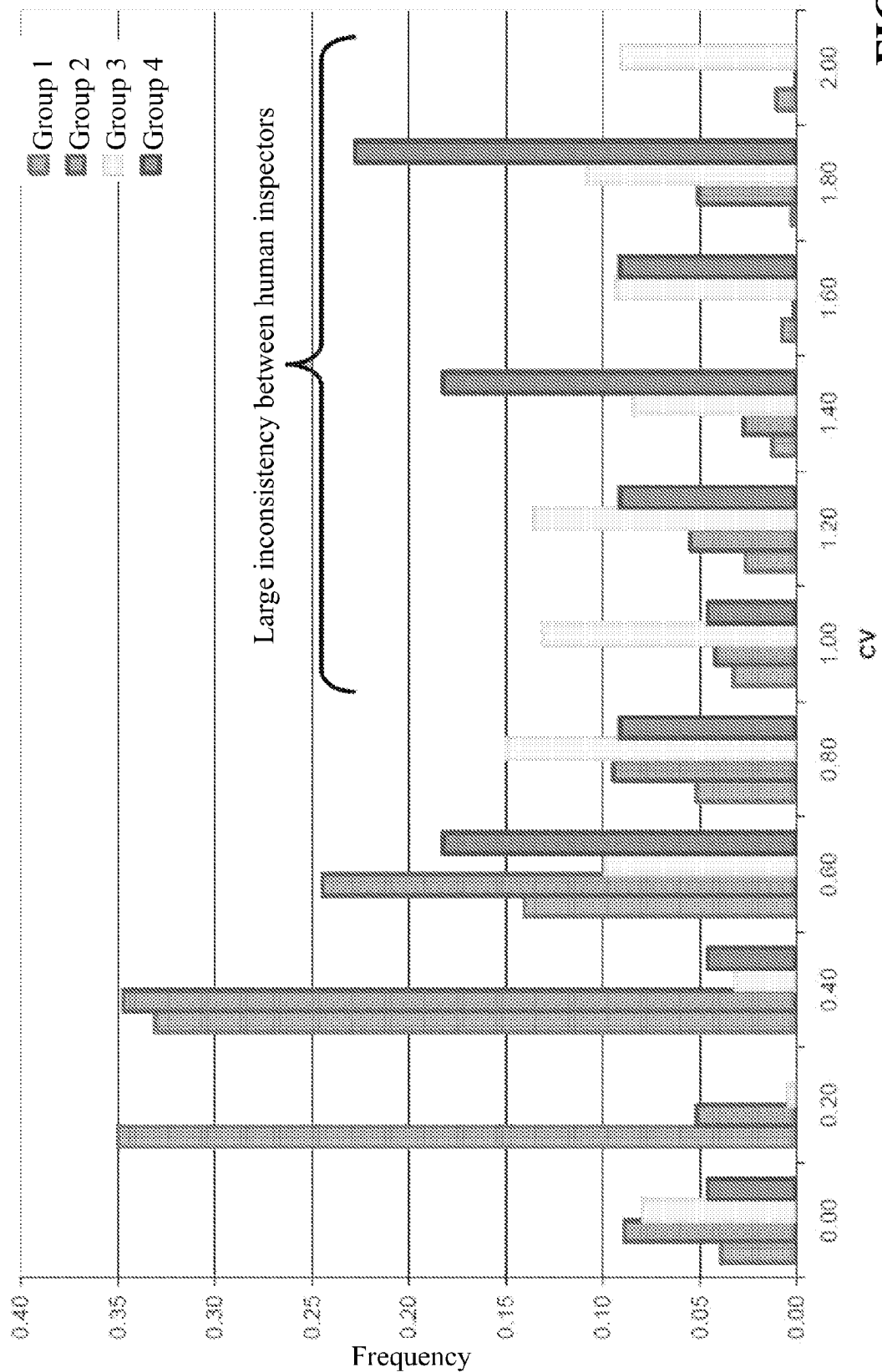
FIG. 40 displays an analysis of a set data produced by human inspectors.

FIG. 40 displays an analysis of a set data produced by human inspectors. The data set consists of four sets of samples with different simulation parameters. The sets three and four in this analysis correspond to samples with more severe defects. Analysis shows that these samples correspond to higher values of CV. The inconsistency of the human inspectors for a sample is an indication that the sample may be inappropriate, due to a number of different reasons, including an unusually severe defect being present in a sample. It is noted that large inconsistency between human inspectors are readily identifiable.

In addition to the removal of outliers, by placing a cap (i.e. limit) on the accepted range for the CV, the consistency analysis contains an inspector-evaluation stage. In this stage, the difference between the scores given by each human inspector and the average scores for the same samples are calculated. The histogram of these differences describes the relative location of the respective human inspector in the group of inspectors.

Figure 41:
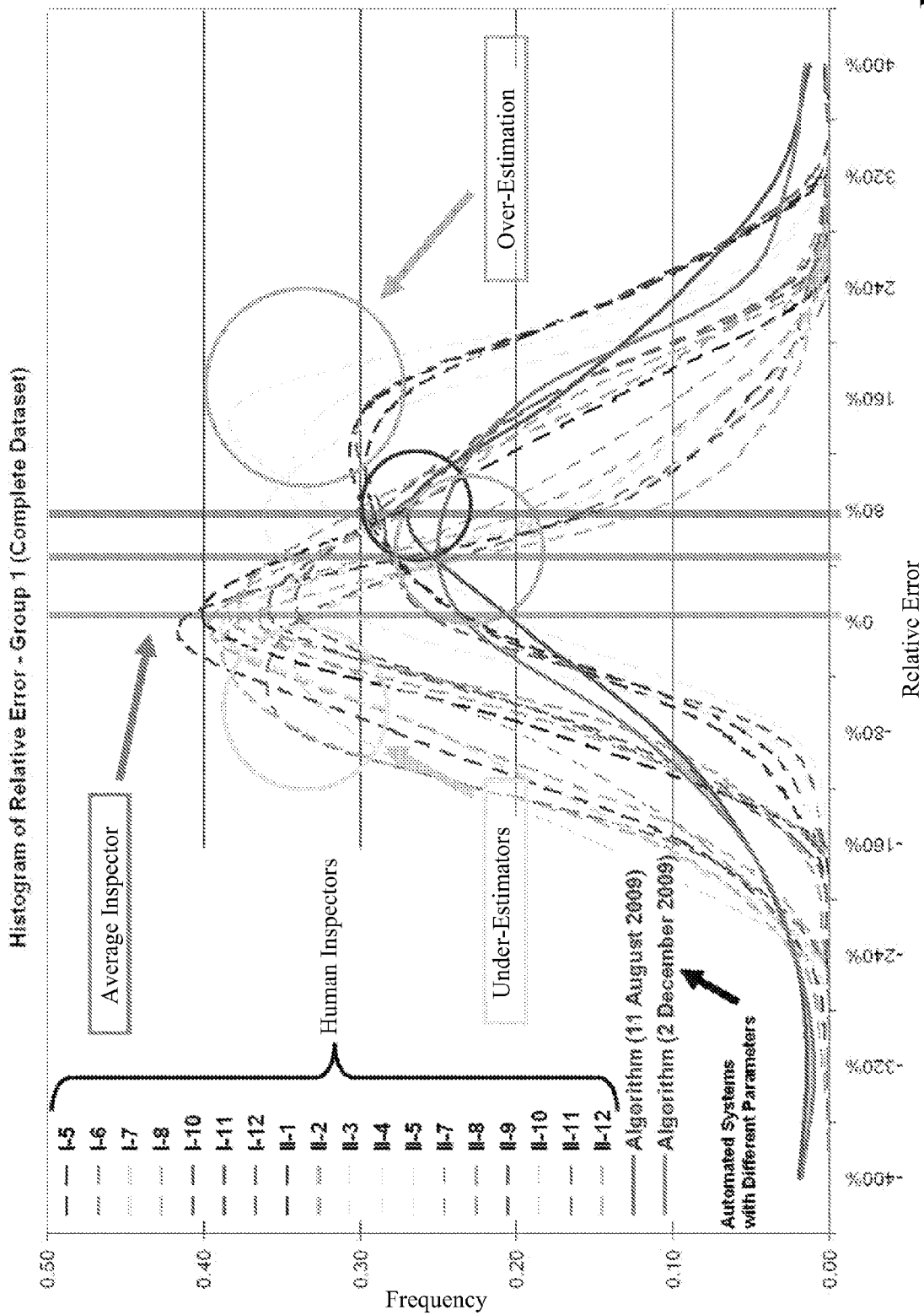
FIG. 41 depicts the results of a sample execution of the developed method for training a POS print inspection system.

FIG. 41 depicts the results of a sample execution of the developed method for training a POS print inspection system. Here, dashed lines correspond to scores provided by individual human inspectors, and the graph compares the relative error scores provided by the individual inspectors versus their frequency. For the present discussion, identification of individual inspectors is not critical. Of more importance is the ability to identify those inspectors whose relative error form the average of the results (labeled as Average Inspector), and the outliers. The outliers would be human inspectors whose relative error scores far below the average (labeled Under-Estimators), and human inspectors whose relative error scores are far above the average (labeled Over-Estimators). Thus, some human inspectors are classified as Under-Estimators and Ever-Estimators, based on the typical difference between their scores and the average score values.

Modeling and Parameter Estimation module 147 identify a number of quality measures to be computed for each sample. These quality measures help determine the quality of the sample from different perspectives. For example, in the case of POS print inspection, the quality measures are the darkness of the characters, the intensity of the background noise, the share of parts missing from the characters, and the ratio of extra parts in the sample. These quality measures are designed so that they evaluate the quality of the samples from different perspectives and also so that a workable relationship between the values of these quality measures for a sample and the average score provide for the same sample by the human inspectors can be established. In the case of POS print inspection, the premise is that the score can be modeled as a linear combination of the aforementioned quality measures.

Determining an appropriate set of quality measures and designing a relationship between the quality measures and the average quality score provided by human inspectors is specific to every application framework. The quality measures and the estimation process for the score should be devised so that an affordable process for finding the parameters of the model could be found. For POS print inspection that process is four-dimensional linear regression.

After the parameters of the model are calculated, the Automated Visual Inspection Process (or system or module) 149 acts as an inspector, and its results are examined by the same process that was applied on the human inspectors. Thus, similar to the error histogram calculated for each human inspector, the automated system, or a different version of it, can be examined using similar error histograms.

FIG. 41 shows two such curves (labeled: "Algorithm (Aug. 11, 2009)" and "Algorithm (Dec. 2, 2009)") for different automated systems trained using different parameters, i.e. different maximum CV thresholds. By adjusting the parameters used by automated visual inspection process 149, it can be trained to produce results similar to an average human inspector.

The developed process also provides a method for evaluating the performance of Defect Simulator 135. As mentioned before the samples are accompanied with simulation parameters. Therefore, after the average human inspector score for each sample is determined, the relationship between simulation parameters and the average scores can be examined.

Figure 42:
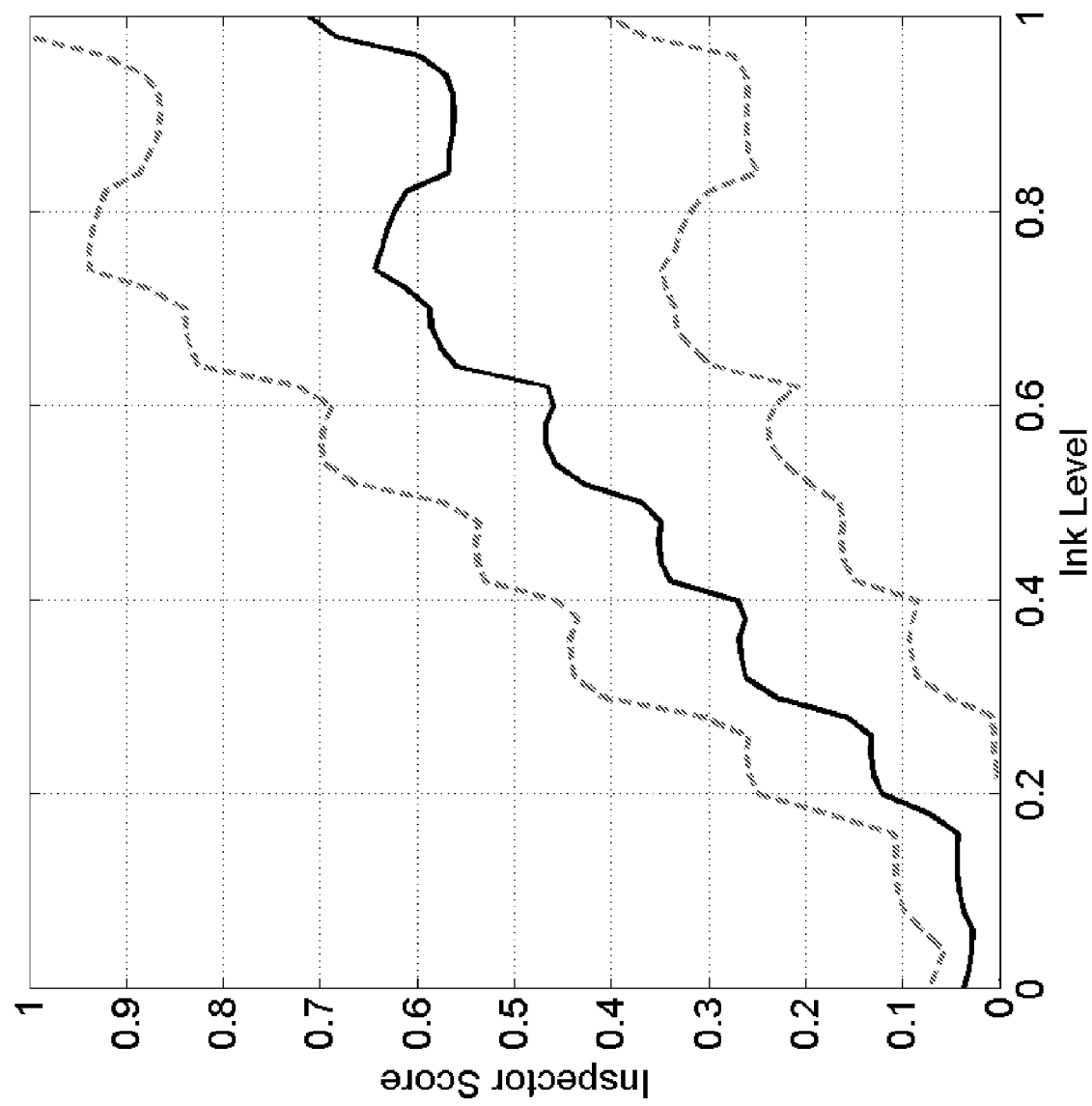
FIG. 42 shows a sample curve generated during the analysis of the human inspector scores and their correlation with the parameters of the Defect Simulator 136.

FIG. 42 shows a sample curve generated during the analysis of the human inspector scores and their correlation with the parameters of the Defect Simulator 136 in a POS print inspection system. Here, the direct relationship between Ink Level, the relative darkness of the characters, and the score given to the respective characters by the human inspectors may be observed.

As shown in FIG. 37, three feedback loops update different parts of the process in every iteration. First, evaluation module 151 compares output results from Automated Visual Inspection Process 149 with those from human inspectors 143. Evaluation module 151 uses these comparison results along with their probable discrepancies, to identify issues in the inspection process (i.e. parameters needing adjustment). During this process different operational parameters of the inspection process are fine-tuned as well. Furthermore, the investigation of the correlation between parameters of Defect Simulator 135 and the feedback provided by the human inspectors 143 is useful in optimizing the Defect Simulator 135. Finally, the results of the evaluation are used in designing the next iterations of the experiment. Through this feedback loop, the areas of strength and weakness of the inspection process are determined and more effort is spent on optimizing the types of defect for which the performance of the inspection system has been less satisfying.

Thus, the present automated inspection system is trained using feedback collected from human inspectors. The following list provides a summary of the steps of a preferred training process.

Sample Collection: A training data set made up of real samples and simulated samples is produced. The simulated samples include defects with controlled severity and characteristics and are generated by the Defect Simulator 135.

Feedback Collection: The data set is presented to a number of human inspectors. Each inspector provides a score as well as other defect specifications for each given sample.

Consistency Analysis: Outlier (human inspectors) are detected and removed from the feedback.

Training: A proper model for the automatic estimation of the score for each sample is selected and trained.

Evaluation: The trained system is compared to the set of human inspectors. The input from the human inspectors is also used for evaluating them based on their input compared to the average. Moreover, the sanity (i.e. efficacy) of the output of the Defect Simulator based on the average human inspector score is examined.

These steps generate the feedback which is used for optimizing different sections of the process, as shown in FIG. 37.

Thus, a print quality assessment system in accord with the present invention detects the symbology present in scanned copies of printed material created by a target printer (i.e. printer under test). A combination of geometrical measures and other quality metrics are collected for the detected content. The system then combines these pieces of information into overall quality measures and provides defect detection details. The process that performs the combination of the individual measures is optimized through using input collected from human inspectors.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of distinguishing glyphs from non-glyph image artifacts in an input image, said method comprising:
providing a data processing device to implement the following steps:
defining a connectedness threshold, said connectedness threshold being a numeric value between a pre-specified numeric range;
defining a numeric effort value, said effort value specifying a fixed number of repetitions;
assigning foreground pixels of said input image a first connectedness value and assigning non-foreground pixels of said input image a second connectedness value;
iterating steps (a) through (d), until the number of iterations matches said effort value, wherein each iteration has a corresponding and predefined scanning pattern and bit mask, said bit mask designating a center pixel location and designating neighboring pixel locations to be considered in the following steps;

(a) identifying the bit scanning pattern and bit mask corresponding to the current iteration;
(b) scanning for processing pixels of the current input image following said scanning pattern, and for each scanned pixel:
overlaying the identified mask onto the current scanned pixel, with the current scanned pixel at the designated center pixel location of the identified mask, and assigning the current scanned pixel a center pixel connectedness measure according to the following relation:
center pixel connected measure=the smaller of [(the highest connectedness value of the pixels at the designated neighboring pixel locations of the identified mask)+1] or [the input connectedness threshold];
(c) IF the number of the current iteration does not match the effort value, THEN updating the connectedness measure of each pixel in the current input image according to the following relation,
IF (connected measure of pixel>0) AND (connected measure of pixel<the connectedness threshold),
THEN (set connected measure of pixel=1),
ELSE (leave the connectedness measure of pixel unchanged);
(d) IF the number of the current iteration matches the effort value, THEN do the following for every pixel having a connectedness measure>0:
IF (connected measure of pixel≥connectedness threshold),
THEN mark pixel as a non-glyph image artifact pixel,
ELSE mark pixel as to a glyph pixel.

2. The method of claim 1, wherein said pre-specified numeric range is from 2 to 254.

3. The method of claim 1, wherein said connectedness threshold is defined as a user-provided, input numeric value.

4. The method of claim 1, wherein said numeric effort value is less than six.

5. The method of claim 1, wherein said numeric effort value is four.

6. The method of claim 1, wherein each iteration of steps (a) through (d) has a unique combination of scanning pattern and bit mask distinct from all other iterations.

7. The method of claim 1, wherein said first connectedness value and said second connectedness value are smaller than said connectedness threshold.

8. The method of claim 7, wherein said first connectedness value is 1 and said second connectedness value is 0.

9. The method of claim 1, wherein in step (b), all the pixels of the current input image are scanned for processing, pixel-by-pixel following said scanning pattern.

10. The method claim 1, wherein in step (b), only foreground pixels of the current input image are scanned for processing.

11. The method of claim 1, further including following step (d), collecting glyph pixels into a clean image representation of said input image and collecting non-glyph image artifact pixels into a defect map.

12. The method of claim 1, wherein said input image is a simulated print of an impact printer, said simulated print being created by:
accessing a template image of a printable character, said template image defining an X-dimension and a Y-dimension in a Cartesian plane;
accessing a grid having a fixed plurality of grid points, resizing said grid relative to the size of said template image, determining the resultant pixel dimensions of said grid points, and mapping each grid point to its corresponding area within said template image based on an alignment of the resized grid to said template image;

accessing an ink_level parameter indicative of a desired ink level;

accessing an impact_x parameter and impact_y parameter indicating a center of impact relative to said X-dimension and a Y-dimension;

accessing a noise_level parameter indicative of a desired noise intensity;

defining a 2D Gaussian filter elongated along the X-dimension as compared to the Y-dimension and centered at said center of impact, said 2D Gaussian filter defining a noise map substantially spanning the X-dimension of said template_image;

applying the following steps to each grid point:
- (a) determining a content level for the current grid point based on the pixel values of the area of the template image corresponding to the current grid point;
- (b) determining a noise_component value for the current grid point, said noise_component value being directly proportional to said noise_level parameter, said ink_level parameter, and the portion of said noise map corresponding to said grip point;
- (c) determining an ink_component value proportional to (1−said content level) and said ink_level;
- (d) defining a print blot in said input image within an area and location corresponding to the area and location of said grid point, wherein the defined print blot is dependent upon a combination of said noise$_{13}$ component value and said ink_component value.

13. A nontransitory computer readable medium embodying instructions for executing a method of simulating a print from an impact printer, said method comprising:

accessing a template image of a printable character, said template image defining an X-dimension and a Y-dimension in a Cartesian plane;

accessing a grid having a fixed plurality of grid points, resizing said grid relative to the size of said template image, determining the resultant pixel dimensions of said grid points, and mapping each grid point to its corresponding area within said template image based on an alignment of the resized grid to said template image;

accessing an ink_level parameter indicative of a desired ink level;

accessing an impact_x parameter and impact_y parameter indicating a center of impact relative to said X-dimension and a Y-dimension;

accessing a noise_level parameter indicative of a desired noise intensity;

defining a 2D Gaussian filter elongated along the X-dimension as compared to the Y-dimension and centered at said center of impact, said 2D Gaussian filter defining a noise map substantially spanning the X-dimension of said template_image;

applying the following steps to each grid point:
- (a) determining a content level for the current grid point based on the pixel values of the area of the template image corresponding to the current grid point;
- (b) determining a noise_component value for the current grid point, said noise_component value being directly proportional to said noise_level parameter, said ink_level parameter, and the portion of said noise map corresponding to said grip point;
- (c) determining an ink$_{13}$ component value proportional to (1−said content level) and said ink_level;
- (d) defining a print blot in an output image within an area and location corresponding to the area and location of said grid point, wherein the defined print blot is dependent upon a combination of said noise_component value and said ink_component value.

14. The method of claim 13, wherein in step (b), the noise component is determined as (noise_level parameter)*(ink_level parameter)*(the portion of said noise map corresponding to said grip point)*(an ink_strength value).

15. The method of claim 14, further comprising:
defining an ink blot of size matching that of a grid point, said ink blot being defined by means of a Gaussian function;
defining a noise blot from a circle shape, said noise blot having a dimension matching said ink blot; and
defining a pressure map from a 2D Gaussian of equal size as said template image;
wherein in step (d), the print blot is defined as:
1−(noise_component value)*(noise blot)+(ink_component value)*(ink blot)*(the area of pressure map that corresponds to the area of the grid point)*(a contrast_boost value).

16. The method of claim 15, further comprising:
accessing a missing_parts_matrix and fitting said missing_parts_matrix over said template image, each cell of said missing_parts_matrix having one of a first indicator value or second indicator value, wherein said first indictor value within a cell is indicative that fading is to be applied to the area of the template image corresponding to the cell, and wherein said second indictor value within a cell is indicative that fading is not to be applied to the area of the template image corresponding to the cell;
accessing a defect_level parameter indicative of the amount of fading applied to said template image, said defect_level parameter being within the range from 0 to 1, wherein 0 correspond to no fading being applied and 1 corresponds to a maximum amount of fading;
wherein:
in step (a), the content level is defined as the average pixel value of the area of the template image corresponding to the current grid point, normalized between 0 and 1, with lower values indicating a darker imprint; and
in step (c), said ink_component value is determined to be (1−said content level)*said ink_level*(1−(the indictor value of the cell of said missing_parts matrix that coincides to the position of the grid point)*(defect_level parameter).

17. The method of claim 16, wherein said missing_parts_matrix and defect_level parameter are user-configurable via a graphics user interface (GUI).

18. The method of claim 16, further comprising:
combining the output images with scanned images of real printouts by physical impact printers into a sample set of training images;
submitting said sample set of training images to human inspectors for human evaluation scoring, said human evaluation scoring providing score values to each of the ink_level parameter, impact_x parameter, noise_level parameter, defect_level parameter, and adjusting said the ink_level parameter, impact_x parameter, noise_level parameter, defect_level parameter to bring their human evaluation scoring within a specified range;
submitting said sample set of training images to an automated visual inspection process for automated scoring according to a list of defect parameters;
comparing the automated scoring results to the human evaluation scoring, and adjusting said defect parameters so that the results of said automated visual inspection process renders automated scores within a predefined range from human evaluation scores from average human inspectors.

19. The method of claim 13, further comprising prior to step (a):
   accessing a ribbon_x parameter introducing an alignment offset of the resized grid to the template image in the X-dimension relative to said template image; and
   accessing a ribbon_y parameter introducing an alignment offset of the resized grid to the template image in the Y-dimension relative to said template image.

20. The method of claim 13, wherein said template image, ink_level parameter, impact_x parameter, and noise_level parameter are user provided inputs.

* * * * *